United States Patent
Ueno et al.

(10) Patent No.: US 10,225,364 B2
(45) Date of Patent: Mar. 5, 2019

(54) CONTENT ACQUISITION DEVICE AND METHOD

(71) Applicant: FUJITSU LIMITED, Kawasaki-shi, Kanagawa (JP)

(72) Inventors: Hitoshi Ueno, Kawasaki (JP); Kenichi Abiru, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 430 days.

(21) Appl. No.: 15/012,933

(22) Filed: Feb. 2, 2016

(65) Prior Publication Data

US 2016/0294976 A1 Oct. 6, 2016

(30) Foreign Application Priority Data

Mar. 30, 2015 (JP) ................................. 2015-069031

(51) Int. Cl.
*H04L 29/08* (2006.01)
*G06F 15/16* (2006.01)

(52) U.S. Cl.
CPC ............. *H04L 67/32* (2013.01); *H04L 67/06* (2013.01); *H04L 67/2842* (2013.01)

(58) Field of Classification Search
CPC ............................ H04L 67/06; H04L 67/2842
USPC ........................................ 709/204, 236, 217
See application file for complete search history.

(56) References Cited

U.S. PATENT DOCUMENTS

| | | | |
|---|---|---|---|
| 2006/0209737 A1* | 9/2006 | Barnhart | H04B 7/18597 370/316 |
| 2007/0027976 A1 | 2/2007 | Sasame et al. | |
| 2007/0101069 A1* | 5/2007 | Corbett | G06F 12/0815 711/141 |
| 2014/0255006 A1* | 9/2014 | Sako | H04N 9/87 386/248 |
| 2014/0317218 A1* | 10/2014 | Chiba | H04L 43/50 709/208 |

FOREIGN PATENT DOCUMENTS

| | | |
|---|---|---|
| JP | 2007-36681 | 2/2007 |
| JP | 2010-67015 | 3/2010 |

* cited by examiner

*Primary Examiner* — David R Lazaro
*Assistant Examiner* — Mariegeorges A Henry
(74) *Attorney, Agent, or Firm* — Fujitsu Patent Center

(57) ABSTRACT

A content acquisition device includes a processor that executes a procedure. The procedure includes: referencing other device holding information in which identification information of another device is associated with the oldest sequence information, making a request to a device indicated by device identification information included in a content acquisition request for acquisition target content, in cases in which an accumulation sequence indicated by sequence information associated with the identification information of the device included in the content acquisition request is older than the accumulation sequence indicated by the sequence information included in the content acquisition request, and searching for a device holding the acquisition target content and making a request to a found device for the acquisition target content, in cases in which the accumulation sequence is newer than the accumulation sequence indicated by the sequence information included in the content acquisition request.

12 Claims, 18 Drawing Sheets

FIG.12
OTHER-CS HOLDING LIST OF CS204                        32
| CS-ID | OLDEST SEQUENCE NUMBER | PREVIOUS SEQUENCE NUMBER |
|---|---|---|
| CS201 | seq38 | seq35 |
| CS203 | seq20 | seq15 |
FIG.13
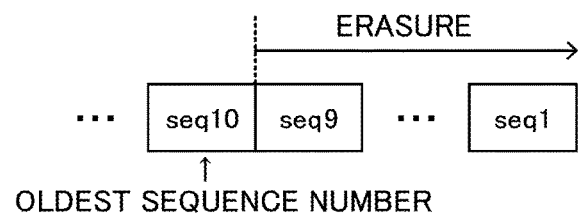
↑
OLDEST SEQUENCE NUMBER
FIG.14
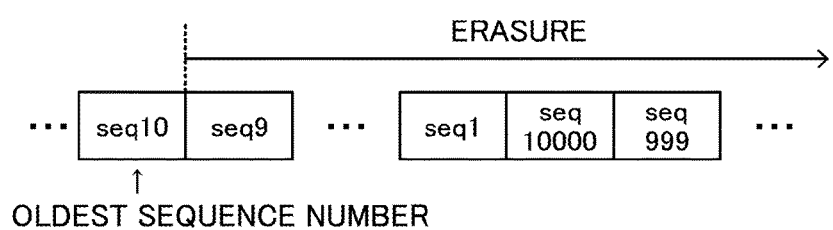
↑
OLDEST SEQUENCE NUMBER

FIG.15

CONTENT MANAGEMENT
LIST OF CS203      33

| CONTENT ID | SEQUENCE NUMBER |
|---|---|
| abc | seq20 |
| ... | ... |
| def | seq51 |

FIG.23

CONTENT MANAGEMENT LIST OF CS204          33

| CONTENT ID | SEQUENCE NUMBER |
|---|---|
| def | seq10 |
| ... | ... |
| abc | seq32 |

FIG.24

OTHER-CS HOLDING LIST OF CS205          32

| CS-ID | OLDEST SEQUENCE NUMBER | PREVIOUS SEQUENCE NUMBER |
|---|---|---|
| CS201 | seq38 | seq35 |
| CS204 | seq5 | seq1 |

FIG.25

CONTENT MANAGEMENT LIST OF CS205          33

| CONTENT ID | SEQUENCE NUMBER |
|---|---|
| def | seq25 |
| ... | ... |
| abc | seq38 |

FIG.26

OTHER-CS HOLDING LIST OF CS205                              32

| CS-ID | OLDEST SEQUENCE NUMBER | PREVIOUS SEQUENCE NUMBER |
|---|---|---|
| CS201 | seq38 | seq35 |
| CS204 | seq51 | seq40 |

CONTENT ACQUISITION DEVICE AND METHOD

CROSS-REFERENCE TO RELATED APPLICATION

This application is based upon and claims the benefit of priority of the prior Japanese Patent Application No. 2015-069031, filed on Mar. 30, 2015, the entire contents of which are incorporated herein by reference.

FIELD

The embodiments discussed herein are related to a recording medium recorded with a content acquisition program, a content acquisition device, and a content acquisition method.

BACKGROUND

Recently, services, such as social networking services (SNS), that share content between particular users are increasing. Moreover, as a result of it now being possible to generate high image quality content due to the increasingly high functionality of terminals, the size of shared content is ballooning, with a tendency for the waiting times for uploading and downloading content to get longer.

Methods that employ cache servers are widely utilized as methods to shorten the waiting times for uploading and downloading content. For example, for content accessed by an unspecified large number of users under management of a cache server, frequently accessed content is distributed to that cache server. This thereby enables the time taken to download content to be shortened for users under management of that cache server.

Moreover, a multicast broadcasting method that prepares an in-use content server and a standby content server has been proposed as technology related to content broadcasting. In this method, the in-use content server broadcasts multicast content, and the standby content server joins corresponding multicast groups, receives multicast packets in which in-use content is transmitted, and monitors the broadcast status of the in-use content server. Moreover, content broadcasting completion information (content duration, sequence number information, absolute completion time information) is registered for each item of content. Based on the broadcast completion time, prior to the predicted broadcast completion of the content, the absence of multicast packets arriving from the in-use content server triggers the initiation of multicast broadcasting of the corresponding content by the standby server.

Technology like that below has also been proposed in relation to transmission of large files. For example, a file transmission device has been proposed that includes a statistical information storing means that stores statistical information, a file storing means that stores files, and a path selection means that selects a control path and a data path based on a settings file or a selection rule. This device further includes a control message processing means that processes control messages, a file management means that segments files and allocates sequence numbers, a file transmission means that transmits files, and an IP transmitting means that performs IP transmission processing for the files.

RELATED PATENT DOCUMENTS

Japanese Laid-Open Patent Publication No. 2007-36681
Japanese Laid-Open Patent Publication No. 2010-67015

SUMMARY

According to an aspect of the embodiments, a non-transitory recording medium storing a content acquisition program that causes a computer to execute a process is provided. The process includes: receiving a content acquisition request including identification information of a device, identification information of acquisition target content, and sequence information indicating a sequence of accumulation of the acquisition target content in the device; referencing other device holding information in which identification information of another device is associated with sequence information corresponding to the oldest content held by the other device; making a request to the device indicated by the device identification information included in the content acquisition request for the acquisition target content, in cases in which the accumulation sequence indicated by the sequence information associated with the identification information of the device included in the content acquisition request is older than the accumulation sequence indicated by the sequence information included in the content acquisition request; searching for a device holding the acquisition target content and making a request to a found device for the acquisition target content, in cases in which the accumulation sequence indicated by the sequence information associated with the identification information of the device included in the content acquisition request is newer than the accumulation sequence indicated by the sequence information included in the content acquisition request; storing, as the other device holding information, the requested content and the identification information of the device that is the acquisition source of the acquired content, in association with the sequence information corresponding to the oldest content held by that device; and responding to the request source of the content acquisition request with identification information of the acquired content, identification information of the device that received the content acquisition request, and sequence information indicating the sequence in which the acquired content was accumulated in the device that received the content acquisition request.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram for explaining selection of a cache server to acquire content from;

FIG. 12 is a diagram illustrating an example of an other-CS holding list;

FIG. 13 is a diagram for explaining determination of a content holding state using sequence numbers;

FIG. 14 is a diagram for explaining determination of a content holding state using sequence numbers;

FIG. 15 is a diagram illustrating an example of a content management list;

FIG. 23 is a diagram illustrating another example of a content management list;

FIG. 24 is a diagram illustrating another example of an other-CS holding list;

FIG. 25 is a diagram illustrating another example of a content management list; and FIG. 26 is a diagram illustrating another example of an other-CS holding list.

DESCRIPTION OF EMBODIMENTS

Detailed explanation follows regarding an example of an exemplary embodiment according to technology disclosed herein, with reference to the drawings. In the present exemplary embodiment, explanation follows regarding a case in which the technology disclosed herein is applied to a content acquisition system in which content that is accessed and shared by a group containing plural users is pre-distributed to a cache server nearby a user. More specifically, the content acquisition system of the present exemplary embodiment is a system in which, in preparation for content requests from users, content shared by the group a user belongs to is pre-distributed to a cache server that has received a group registration (subscription) from that user.

First Exemplary Embodiment

Figure 1:
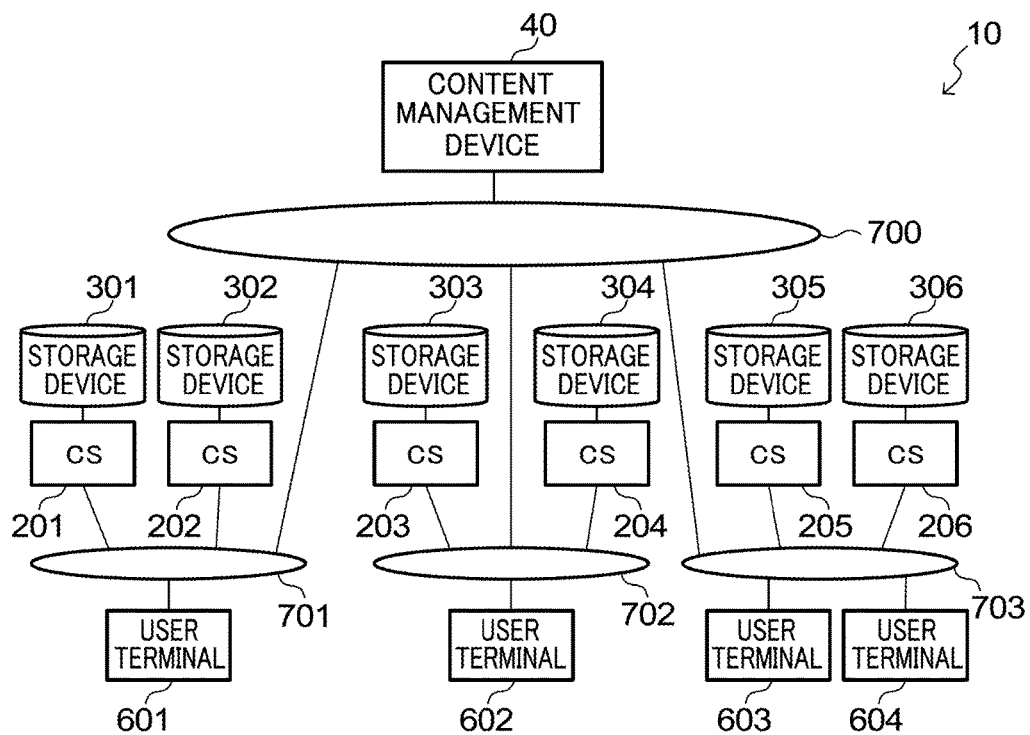
FIG. 1 is a block diagram illustrating a schematic configuration of a content acquisition system.

As illustrated in FIG. 1, a content acquisition system 10 according to the present exemplary embodiment includes a content management device 40, plural cache servers (CS) 201 to 206, plural storage devices 301 to 306, and plural user terminals 601 to 604. The content management device 40 is connected to a wide-area network 700. The wide-area network 700 is connected to each of local networks 701, 702, 703. Generally there are more relay devices provided in a wide-area network than the number of relay devices provided in a local network. Namely, the communication between local networks through a wide-area network has a higher communication cost than communication within the local network due to the greater number of relay devices communication passes through.

In the example illustrated in FIG. 1, each of the cache servers 201 to 206, and each of the storage devices 301 to 306, are connected one-to-one. The cache servers 201, 202 are connected to the local network 701. The cache servers 203, 204 are connected to the local network 702. The cache servers 205, 206 are connected to the local network 703.

Each of the cache servers 201 to 206 are configured similarly to each other and so in the following explanation reference will be made to "cache server 20$n$" when not discriminating between the cache servers 201 to 206. Each of the storage devices 301 to 306 are also configured similarly to each other, and so in the following explanation reference will be made to "storage device 30$n$" when not discriminating between the storage devices 301 to 306.

In the example of FIG. 1, the user terminal 601 is connected to the local network 701, the user terminal 602 is connected to the local network 702, and the user terminals 603, 604 are connected to the local network 703. However, each of the user terminals 601 to 604 are portable terminals such as a mobile phone, a smartphone, a tablet terminal, or a notebook-type personal computer, and are connectable to any of the local networks 701, 702, 703. In the following explanation reference will be made to "user terminal 60$n$" when not discriminating between the user terminals 601 to 604.

Note that the network configuration of the content acquisition system 10 is not limited to that of the example of FIG. 1. The number of cache servers 20$n$, the number of storage devices 30$n$, and the number of user terminals 60$n$ included in the content acquisition system 10 are also not limited to those of the example of FIG. 1.

Figure 2:
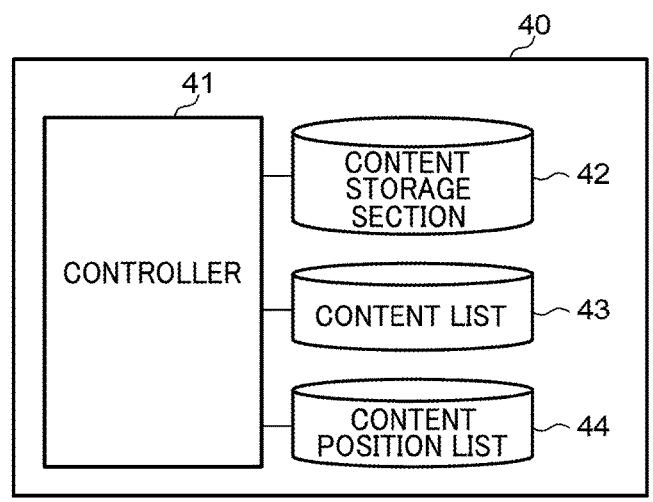
FIG. 2 is a block diagram illustrating a schematic configuration of a content management device.

As illustrated in FIG. 2, the content management device 40 includes a controller 41, a content storage section 42, a content list 43, and a content position list 44.

Plural items of content are stored in the content storage section 42 for broadcasting to users. The content is, for example, image data, video data, music data, or text data.

Based on the history of content previously accessed by users, the controller 41 extracts a group of users that access the same content. Then, for each group, the controller 41 identifies, as content shared by that group, matching content accessed by users belonging to that group, and generates a content list which registers information indicating the shared content for each group.

Figure 3:
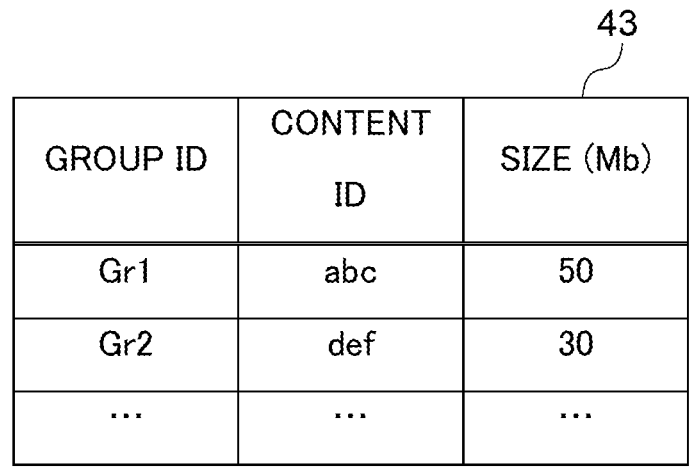
FIG. 3 is a diagram illustrating an example of a content list.

FIG. 3 illustrates an example of a content list 43. In the example of FIG. 3, a group ID that is identification information of that group, content ID that is identification information of content shared by that group, and the size of the shared content, are associated with each other for each of the groups. Namely, the entry <Gr1, abc, 50 Mb> in the content list 43 illustrated in FIG. 3 means that "the group with group ID=Gr1 has shared access to the content with content ID=abc having a file size of 50 Mb". The controller 41 stores the created content list 43 in a specific storage region of the content management device 40. Note that the group having group ID=Gm is denoted "group Gm", and content having content ID=n is denoted "content n", hereafter.

The controller 41 may distribute each of the plural items of content stored in the content storage section 42 to any of the cache servers 20$n$. One item of content may be distributed to one cache server, or may be distributed to plural cache servers. The distribution of content to the cache servers 20$n$ means that the content is stored in a content storage section 34 (described in detail below) of the storage device 30$n$ according to the cache server 20$n$.

Figure 4:
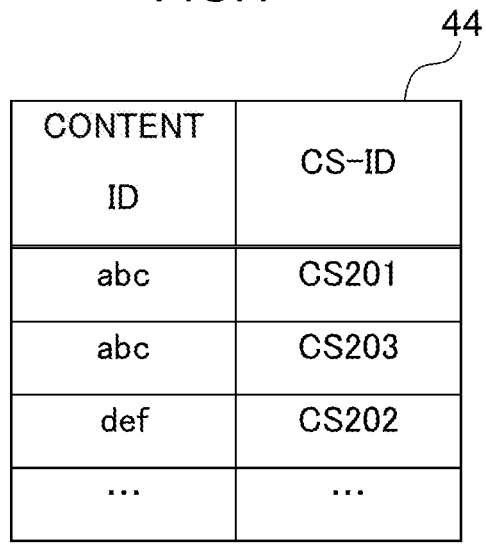
FIG. 4 is a diagram illustrating an example of a content position list.

The controller 41 creates a content position list of information indicating what content was distributed to which cache server 20n, namely the position of each item of content. FIG. 4 illustrates an example of a content position list 101. In the example of FIG. 4, the content ID of the content, and the cache server ID (CS-ID) that is identification information of the cache server to which that content has been distributed, are associated with each other. For example, the content position list 101 illustrated in FIG. 4 includes an entry of <abc, CS201>. This entry means "the content abc is held on cache server CS201". The controller 41 stores the created content position list 44 in a specific region of the content management device 40. Note that in the present exemplary embodiment, the CS-ID of the cache server 20n is denoted "CS20n".

When a change has occurred in the distribution state of content distributed to each of the cache servers 20n, the controller 41 acquires information from each of the cache servers 20n by processing, described below. The controller 41 then updates the content position list 44 based on the acquired information.

The controller 41 responds to content position related enquiries from the cache server 20n. More specifically, when a group ID is received from the cache server 20n, the controller 41 acquires the content ID and content size corresponding to the received group ID from the content list 43. Then, the controller 41 references the content position list 44, acquires all of the CS-IDs corresponding to the acquired content ID, and returns the content ID and size to the cache server 20n.

Figures 5, 6:
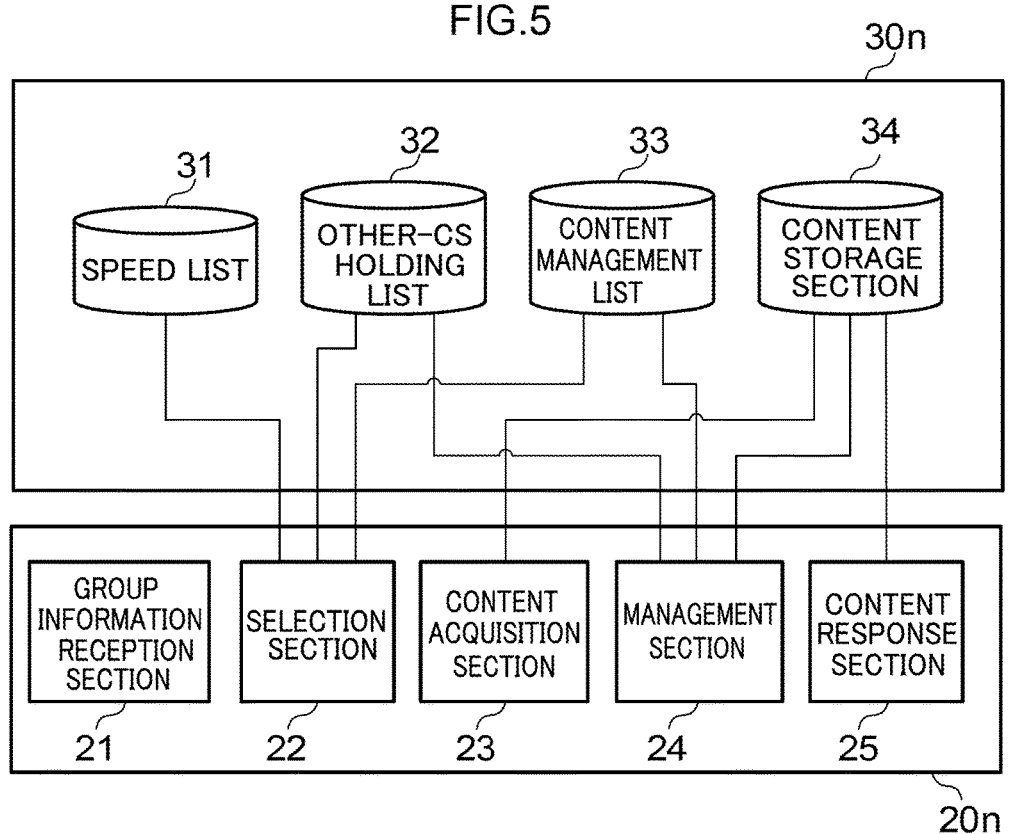
FIG. 5 is a functional block diagram illustrating a schematic configuration of a cache server and a storage device.
FIG. 6 is a diagram illustrating an example of a speed list.

Next, detailed explanation follows regarding the cache servers 20n and the storage devices 30n. As illustrated in FIG. 5, the storage devices 30n each store a speed list 31, an other-CS holding list 32, and a content management list 33. Each storage device 30n includes a content storage section 34.

The speed list 31 is a list in which information is registered indicating the communication state between the cache server 20n corresponding to the storage device 30n and each of the other cache servers 20n. The example illustrated in FIG. 6 illustrates a speed list 31 of the cache server 204. In the example of FIG. 6, the CS-ID of another cache server 20n, and a throughput (Mbps) expressing the data transmission volume per unit time with the other cache server 20n, are associated with each other. Namely, the entry <CS201, 2 Mbps> in the speed list 31 illustrated in FIG. 6, which is held by the cache server 204, means that "the throughput between the cache server 204 and the cache server 201 is 2 Mbps".

There are as many entries recorded in the speed list 31 as the number of other cache servers 20n. The value of the throughput recorded in the speed list 31 is the throughput as viewed from the cache server 20n holding the speed list 31, and the values in the speed list 31 held by each of the cache servers 20n are different for each of the cache servers 20n. "The speed list 31 is held by the cache server 20n" refers to the speed list 31 stored on the storage device 30n corresponding to the cache server 20n.

Content acquired from the content management device 40, or another cache server 20n, is stored in the content storage section 34.

Description follows regarding the other-CS holding list 32 and the content management list 33.

The cache server 20n includes a group information reception section 21, a selection section 22, a content acquisition section 23, a management section 24, and a content response section 25. Note that the group information reception section 21 is an example of a reception section and a response section of technology disclosed herein. The selection section 22 and the content acquisition section 23 are an example of a request section of technology disclosed herein. The management section 24 an example of a storage controller and an erasure section of technology disclosed herein.

Figure 7:
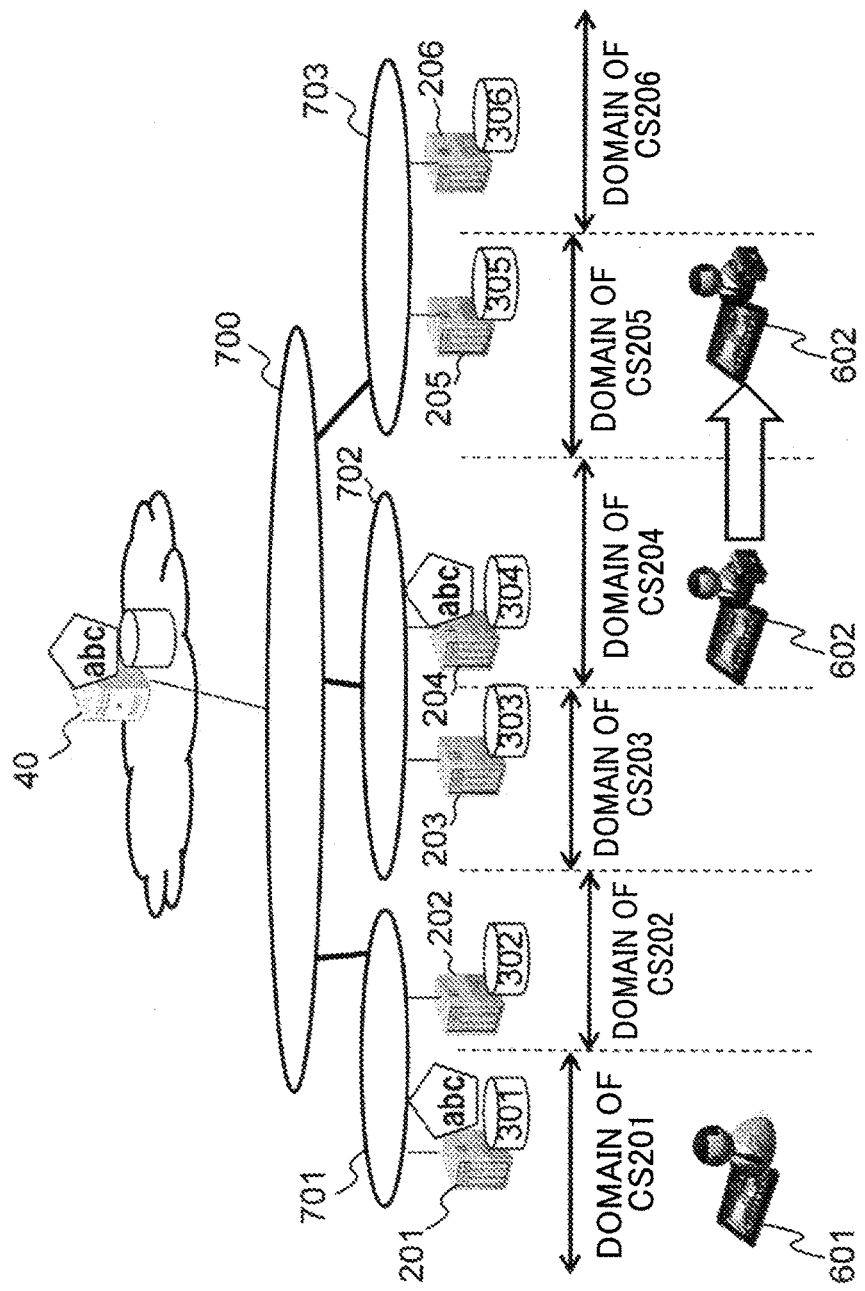
FIG. 7 is a diagram for explaining group registration.

The group information reception section 21 receives group information from the user terminals 60n under management of its own device. For example, as illustrated in FIG. 7, regions to be handled by each of the cache servers 20n are determined according to the physical position of the cache server 20n. Operation of the user terminal 60n by a user in a region of a given cache server 20n causes a group registration (subscription) to be made to the cache server 20n corresponding to that region. In the present exemplary embodiment, the cache server 20n corresponding to the region in which the user terminal 60n is present, is a cache server nearby the user terminal 60n. The group registration may be made, for example, by transmitting a message including group information of the group to which the user belongs to the nearby cache server when a target application is executed by the user terminal 60n. In the present exemplary embodiment, a state in which user terminals 60n are registered as a group to a nearby cache server refers to a state in which the user terminals 60n are under management of that cache server 20n.

For example, in the example illustrated in FIG. 7, the user terminal 601 operating in a region of the cache server 201 is under management of the cache server 201. Sometimes the user terminal 602 under management of the cache server 204 enters the region of the cache server 205 due to moving. In such a case, the user terminal 602 leaves the management of the cache server 204 and becomes under management of the cache server 205.

Explanation follows regarding the mechanism by which group information transmitted from the user terminal 60n is delivered to the nearby cache server. For example, an application started up by a user terminal 60n (referred to below as a terminal app) is able to utilize a normal Domain Name Service (DNS) enquiry. A terminal app normally performs a DNS enquiry using the connection destination URL pre-set in the terminal app as a key, acquires the IP address of the connection destination, and transmits a message to the IP address.

Figure 8:
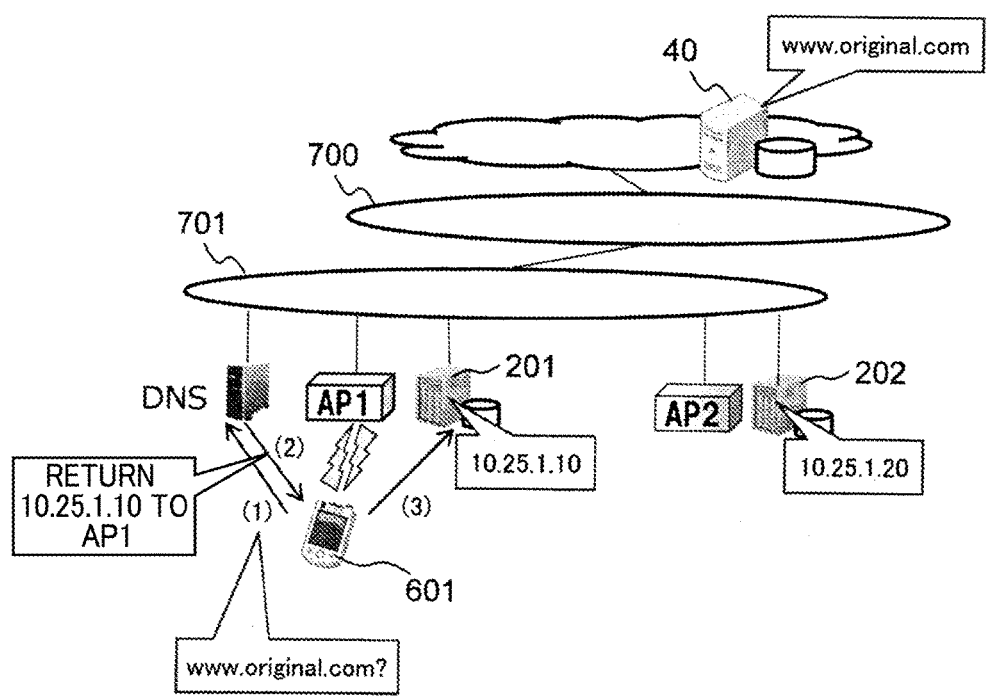
FIG. 8 is a diagram for explaining group registration.

For example, as illustrated in FIG. 8, the user terminal 601 also first submits an enquiry ((1) in FIG. 8) to the DNS server using the URL of the content management device 40 as the key when performing group registration. Information indicating the access point (AP) and the IP address of a cache server near to the AP, are stored associated in the DNS server. The DNS server returns the IP address (10.25.1.10) of the cache terminal 201 nearby the connection AP of the user terminal 601 ((2) in FIG. 8). Group registration is thereby made to the user terminal 201 nearby the user terminal 601 ((3) in FIG. 8).

As a method to ascertain the connection AP of a user terminal, the DNS server may, for example, determine a range of IP addresses allocated to user terminals for each connection AP, such that the connection AP can be known from the transmission source IP address.

Moreover, there is a need to perform group registration to a new nearby cache server when the user terminal 60n has moved, like the user terminal 602 illustrated in FIG. 7, while in an already started up state of the terminal app. This method, for example, uses the terminal app to monitor the ID of the connection AP (base station ID and wireless basic service set ID (BSSID); normally the MAC address of the connection AP). Then group information is transmitted to the nearby cache server when the ID of the connection AP updates.

In the present exemplary embodiment, explanation is given of a case in which the group information reception section 21 receives a message including a group ID that is identification information of the group as group information from the user terminal 60*n*, however there is no limitation thereto. For example, the group information reception section 21 may receive the identification information of a user (for example a user ID). In such cases, a correspondence list between user identification information and group information, is pre-saved in the group information reception section 21, enabling group information of that user to be acquired from received user identification information and the correspondence list.

Based on the group ID received by the group information reception section 21, the selection section 22 selects one of the other cache servers 20*n* from which to acquire content shared by the group indicated by this group ID. The selection section 22 selects the cache server 20*n* capable of the earliest content acquisition completion.

More specifically, due to a group ID received by the group information reception section 21 being transmitted to the content management device 40, the selection section 22 makes an enquiry regarding the position of content shared by the group indicated by that group ID. The selection section 22 receives the content ID, content size, and content position (CS-ID) of the shared content, which corresponds to the group ID, returned from the content management device 40.

Figure 9:
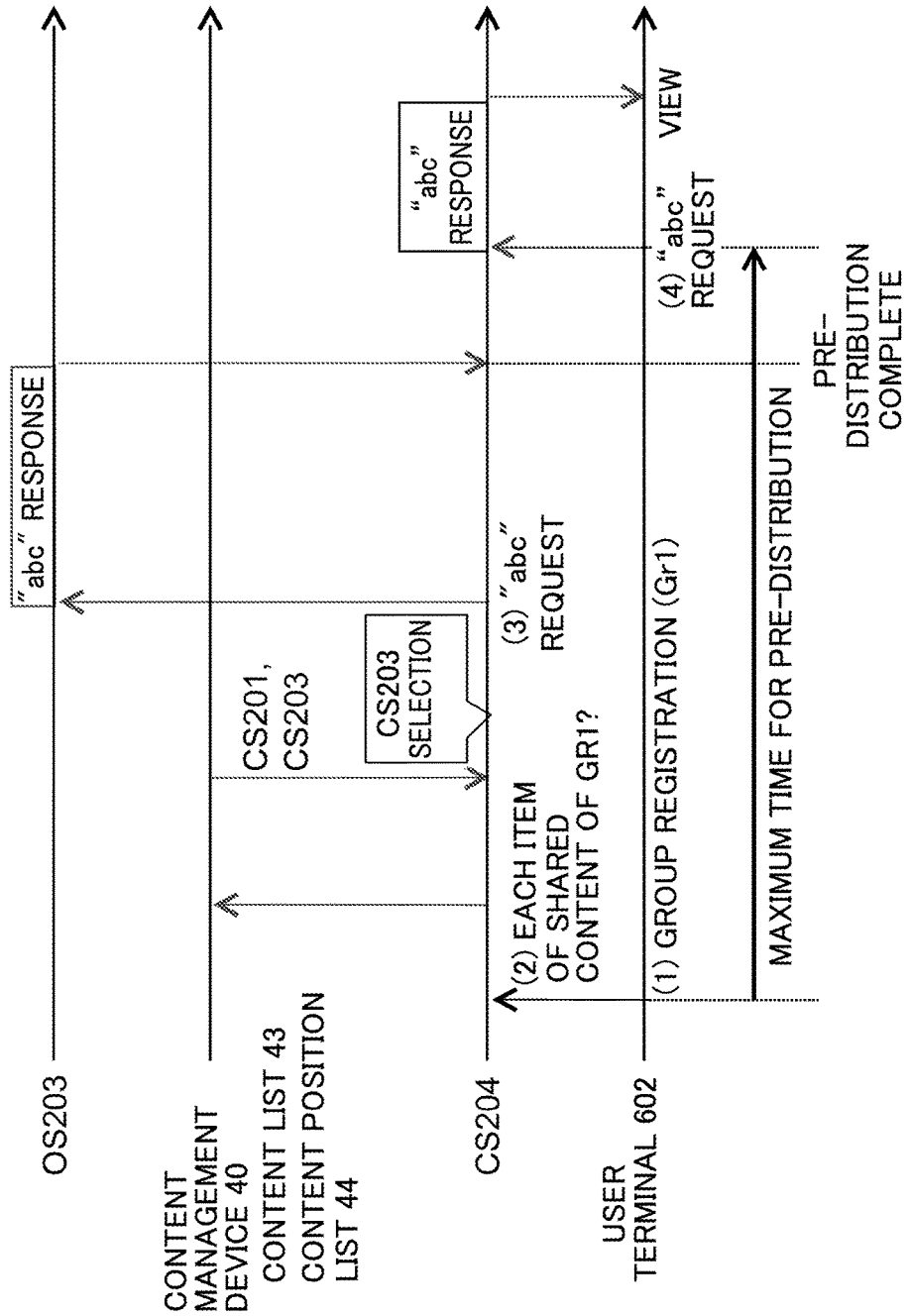

For example, as illustrated in FIG. 9, the user terminal 60₂ group registers to the cache server 204 such that the group information reception section 21 of the cache server 204 receives the group ID=Gr1 ((1) in FIG. 9). The selection section 22 of the cache server 204 transmits the group ID=Gr1 to the content management device 40, and enquires as to which cache server 20*n* holds the shared content of the group Gr1.

In the content management device 40, the controller 41 uses the group ID=Gr1 as a key to acquire the content ID=abc and the content size=50 Mb from, for example, the content list 43 illustrated in FIG. 3. Moreover, the controller 41 uses the acquired content ID as a key, and acquires, as the position of the content abc, the CS-IDs CS201 and CS203 of the cache server 201 and the cache server 203 from, for example, the content position list 44 illustrated in FIG. 4. The controller 41 returns the content ID and content size acquired from the content list 43, and the content position (CS-ID) acquired from the content position list 44, to the cache server 204. For example, the information returned to the cache server 204 is information such as <abc, 50 Mb, (CS201, CS203)>.

The selection section 22 acquires the information returned from the content management device 40. For each content position included in the acquired information, namely for each cache server 20*n* distributed with the shared content, the selection section 22 calculates the predicted acquisition completion time for a case in which the content is acquired from that cache server 20*n*.

More specifically, the selection section 22 uses the acquired CS-ID as a key to acquire from the speed list 31 the throughput between each of the cache servers 20*n* which are content positions and its own device. Then, based on the content size received from the content management device 40 and the throughput with each of the cache servers 20*n*, the selection section 22 calculates the acquisition time needed to acquire the content from each of the cache servers 20*n*. The selection section 22 takes the time expressed by the current time added to the acquisition time as the predicted acquisition completion time.

For example, a throughput=2 Mbps with the cache server 201, and a throughput=25 Mbps with the cache server 203 is acquired from the speed list 31 illustrated in FIG. 6. The size of the content abc is 50 Mb, and so the acquisition time from the cache server 201 is 25 seconds, and the acquisition time from the cache server 203 is 2 seconds. Thus in cases in which the current time is 11:20:15, then the predicted acquisition completion time from the cache server 201 is 25 seconds after 11:20:15, i.e. 11:20:40, and the predicted acquisition completion time from the cache server 203 is 2 seconds after 11:20:15, i.e. 11:20:17.

As illustrated in FIG. 9, the aim in the present exemplary embodiment is to pre-distribute the content to the cache server 20*n* nearby to the user terminal 60*n* in the interval from the terminal app start up time ((1) in FIG. 9) to the request for content from the user terminal 60*n* ((4) in FIG. 9). Namely, the time from the terminal app start up time until request of content from the user terminal 60*n* is the maximum time for pre-distribution. The selection section 22 therefore selects the cache server 203, which has the earliest predicted acquisition completion time out of the cache servers 201 and 203 that hold the shared content, this being the requested content ((3) in FIG. 9).

A case is considered here in which the user terminal 60*n* moves in a state in which a terminal app has started up. For example, as illustrated in FIG. 7, the user terminal 60₂ moves from being group registered under management of the cache server 204 to being under management of another cache server 205 while the terminal app is started up. Hereafter, the cache server 20*n* to which the user terminal 60*n* was group registered prior to movement is referred to as "the movement origin cache server 20*n*". The cache server 20*n* to which the user terminal 60*n* is group registered after moving in a state in which a terminal app is started up is referred to "the movement destination cache server 20*n*".

In such cases, it is envisaged that, using processing similar to that of FIG. 9, the movement origin cache server 204 and the movement destination cache server 205 will each make an enquiry to the content management device 40, and will acquire the content abc. However, there is a high possibility that the movement origin cache server 204 is already holding the content abc when group registration to the movement destination cache server 205 is performed. Moreover, since it is envisaged that the communication distance between the movement destination cache server 205 and the movement origin cache server 204 is short, it is conceivable that the predicted acquisition completion time will be earlier when acquiring content form the movement origin cache server 204. The present exemplary embodiment therefore considers acquiring content held by the movement origin cache server 20*n*.

Figure 10:
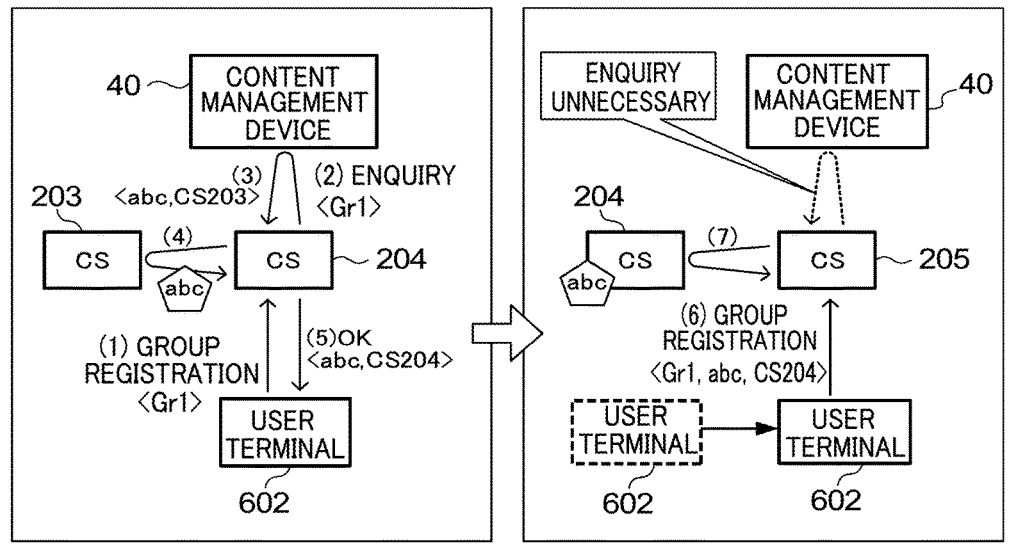
FIG. 10 is a diagram for explaining group registration to a movement origin cache server and a movement destination cache server.

For example, as illustrated in the left diagram of FIG. 10, in group registration when the terminal app is starting up, the cache server 204 (1) receives the group registration, (2) makes an enquiry to the content management device 40, (3) acquires the content position from the content management device 40. Then the cache server 204 (4) acquires the content abc from the cache server 203 that holds the content. At this stage, the cache server 204 now holds the content abc. The cache server 204 therefore includes content position information, indicating that the content abc is held by the cache server 204, in a response to the user terminal 60₂ that states that a group registration was received ("OK" of (5) in FIG.

10). In the example at the left side of FIG. 10, <abc, CS204> is an example of content position information.

Then, in cases in which the user terminal 602 moves so as to be under management of the cache server 205 in a state in which the terminal app remains started up, the user terminal 602 becomes group registered to the cache server 205. In this event, as illustrated at the right side of FIG. 10, (6) content position information acquired from the movement origin cache server 204 is included in the group registration message. This enables the movement destination cache server 205 to confirm that the movement origin cache server 204 holds the shared content abc of the group Gr1 indicated by the group ID=Gr1 included in the group registration message. The movement destination cache server 205 is therefore able to (7) acquire the content abc from the movement origin cache server 204 without making an enquiry to the content management device 40. This enables enquiries to the content management device 40 for content positions to be dispensed with, enabling a reduction in time needed to pre-distribute content.

However, since the accumulated volume of the content storage section 34 in the storage devices 30n corresponding to the respective cache servers 20n is restricted, the content is erased after time has elapsed since accumulation. Accordingly, when the user terminal 602 is group registered to the movement destination cache server 205, the content abc sometimes does not already exist on the movement origin cache server 204. In such cases, content is not acquirable from the movement origin cache server 204, such that the enquiry needs to be made to the content management device 40 again, the cache server 20n holding the target content needs to be found, and the content needs to be re-requested. Accordingly, as illustrated by (7) in the right diagram of FIG. 10, content requests made to the movement origin cache server 204 would be rendered ineffective.

Therefore, in the present exemplary embodiment, the user terminals 60n are made to hold content position information, and that content position information is acquired together with the group registration. Then, a content request is made to the movement origin cache server 20n in cases in which the acquired content position information is new, or an enquiry is made to the content management device 40 in cases in which the content position information is old. Determination as to whether the content position information is new or old is performed by allocating to each item of content a sequence number indicating a numbering sequence of accumulation of items of content in the content storage section 34 corresponding to the respective cache server 20n, and using this sequence number. It is sufficient for the sequence number to enable the numbering sequence in which the items of content accumulated in the content storage section 34 to be ascertained. In the present exemplary embodiment, for the sake of simple explanation, explanation is given regarding a case in which consecutive numbers from 1 onward are allocated to items of content as sequence numbers, in the sequence that they accumulated in the content storage section 34.

Figure 11:
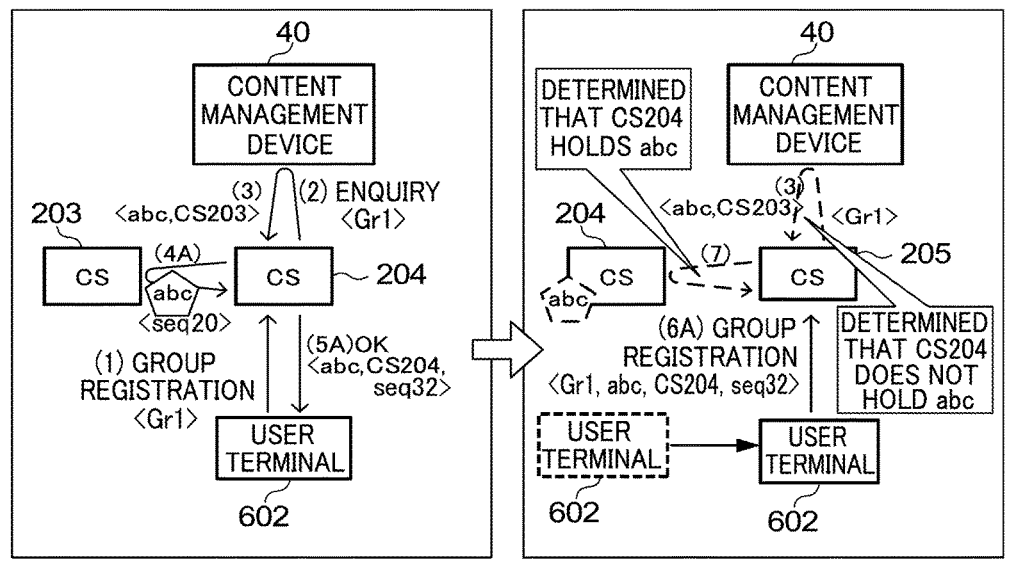
FIG. 11 is a diagram for explaining group registration to a movement origin cache server and a movement destination cache server.

More specifically, as illustrated at the left side of FIG. 11, when (4A) the movement origin cache server 204 acquires the content, the sequence number of the oldest item of content held by the cache server 203 of the content acquisition source is also acquired. Hereafter, the sequence number allocated to the oldest item of content held by the respective cache server 20n is referred to as "the oldest sequence number". In the movement origin cache server 204, the acquired oldest sequence number is stored associated with the CS-ID of the cache server 203 that is the content acquisition source. Each of the cache servers 20n thereby manages the stored state of content in the other cache servers 20n by acquiring the oldest sequence number of the other cache server 20n, each time an item of content is acquired from another cache server 20n.

On the other hand, the movement origin cache server 204 manages content held by the device itself by allocating new sequence numbers to content acquired by the device itself. When (5A) content position information is included in the response to the user terminal 602 stating that the group registration was received, the movement origin cache server 204 also includes the sequence number allocated to the acquired content abc by the device itself. Namely, the example <abc, CS204, seq32> of (5A) in FIG. 11 indicates that "the content abc was the $32^{nd}$ item of content to be accumulated in the content storage section 34 corresponding to the cache server 204".

Then, as illustrated at the right side of FIG. 11, the user terminal 602 performs (6A) group registration by moving to be under management of the cache server 205 in a state in which the terminal app remains started up. In this event, the content position information is added to the group registration message, and the sequence number received from the movement origin cache server 204 is also included in the group registration message together with the content position information.

Moreover, the movement destination cache server 205 compares the oldest sequence number of the movement origin cache server 204 managed by the device itself, against the sequence number included in the group registration message. The oldest sequence number indicates that items of content allocated sequence numbers older than the oldest sequence number have already been erased from that cache server 20n. Namely, when the sequence number included in the group registration message is older than the oldest sequence number of the movement origin cache server 204, the movement origin cache server 204 can determine that the target content abc is not held. In such cases, the movement destination cache server 205 makes an enquiry to the content management device 40 without making an unnecessary content request to the movement origin cache server 204 ((2) and (3) in FIG. 11).

However, when the sequence number included in the group registration message is newer than the oldest sequence number of the movement origin cache server 204, the movement origin cache server 204 can determine that there is a high possibility of the target content abc being held. In such cases, the movement destination cache server 205 makes a content request to the movement origin cache server 204 without making an enquiry to the content management device 40 ((7) at the right side of FIG. 11).

Explanation follows regarding the functionality of the group information reception section 21 and selection section 22, the remaining functional sections, the other-CS holding list 32, and the content management list 33, which are for implementing the processing of FIG. 11 described above.

Note that in order to implement the processing of FIG. 11 described above, the content position information (the content ID and CS-ID) and the sequence number are received from the cache server 20n by the user terminal 60n, and caused to be held by temporary storage functionality. Moreover, the temporarily stored content position information and the sequence number described above are caused to be held by functionality included in the group registration message by the user terminals 60n.

Hereafter, the movement origin cache server 20n is also referred to as "the movement origin CS", and the CS-ID of the movement origin CS is also referred to as "the movement origin CS-ID". For the convenience of explanation, the movement origin cache server explained above (the cache server 204 in the example of FIG. 10 and FIG. 11) is employed to represent the present exemplary embodiment. However, in the cache server 20n that received the group registration, the user terminals 60n do not necessarily specify the cache server 20n that was group registered just before. In the present exemplary embodiment, the cache server 20n indicated by the CS-ID included in the group registration message is treated as the movement origin CS. Hereafter, the acquisition target content is also referred to as "the target content", the content ID of the target content is also referred to as "the target content ID", and the sequence number allocated to the target content in the movement origin CS is also referred to as "the target sequence number".

When the target content ID and the sequence number from the management section 24, described later, have been reported to the group information reception section 21, the group information reception section 21 generates a message including the reported target content ID and sequence number and the CS-ID of the device itself. Then, the group information reception section 21 transmits the generated message to the user terminals 60n as a message stating that the group registration was received.

When the content ID, the CS-ID, and the sequence number are included in the group registration message received by the group information reception section 21, the selection section 22 references the other-CS holding list 32, and determines whether or not to make a content request to the movement origin CS. As described above, the other-CS holding list 32 is a list in which information is registered for managing the held state of content in the other cache servers 20n. FIG. 12 illustrates an example of the other-CS holding list 32. Note that FIG. 12 is an example of an other-CS holding list 32 held by the cache server 204. In the example of FIG. 12, the CS-IDs of other cache servers 20n, the oldest sequence numbers acquired from those cache servers 20n, and the previous sequence numbers are associated with one another. The "previous sequence number" is the sequence number that was registered as the "oldest sequence number" before the oldest sequence number acquired this time. Although more detailed explanation follows, briefly, the previous sequence numbers are employed to determine the content held state in the other cache servers 20n when the sequence numbers are limited.

More specifically, the selection section 22 acquires the oldest sequence number and the previous sequence number of the movement origin CS from the other-CS holding list 32, using the CS-ID included in the group registration message as a key. Moreover, the selection section 22 extracts the sequence number included in the group registration message as the target sequence number.

As described above, since consecutive sequence numbers are allocated from 1 onward in the present exemplary embodiment, when an item of content is allocated a sequence number older (smaller) than the oldest sequence number ("seq10" in the example of FIG. 13), this indicates that the item of content has already been erased, as illustrated in FIG. 13. However, the sequence number is limited in the present exemplary embodiment, and when the sequence numbers to be allocated to acquired content have been exhausted, sequence numbers are reused from 1 onwards. In such cases, as illustrated in FIG. 14, it is possible that sometimes even content allocated a sequence number newer (larger) than the oldest sequence number has been erased. Note that in FIG. 13 and FIG. 14, each box represents one item of content, and the sequence number allocated to each item of content is written inside the respective box.

The selection section 22 first determines whether or not the previous sequence number of the movement origin CS is older than the oldest sequence number. In cases in which the oldest sequence number is older than the target sequence number, when the previous sequence number is older than the oldest sequence number, the selection section 22 selects the movement origin CS as the content request target. However, in cases in which the oldest sequence number is newer than the target sequence number, when the previous sequence number is older than the oldest sequence number, the selection section 22 makes a content position enquiry to the content management device 40. The selection section 22 thereby selects the cache server 20n that has the earliest predicted acquisition completion time as the content request destination according to the above description.

In cases which the target sequence number is the oldest sequence number or greater but less than the previous sequence number, when the previous sequence number is newer than the oldest sequence number, the selection section 22 selects the movement origin CS as the content request destination. However, in cases in which the target sequence number is less than the oldest sequence number or is the previous sequence number or greater, when the previous sequence number is newer than the oldest sequence number, the selection section 22 makes a content position enquiry to the content management device 40. The selection section 22 thereby selects the cache server 20n that has the earliest predicted acquisition completion time as the content request destination, as described above.

Moreover, the selection section 22 reports the target content ID, and the CS-ID of the selected cache server 20n to the content acquisition section 23. Note that when the target content has already been pre-distributed to the device itself, the selection section 22 reports the target content ID to the management section 24, described later, without selecting a content acquisition destination cache server 20n.

The content acquisition section 23 makes a request to the cache server 20n indicated by the CS-ID reported from the selection section 22, for the content indicated by the target content ID reported from the selection section 22.

Moreover, the content acquisition section 23 acquires the content and content ID transmitted from the other cache server 20n, and the CS-ID and oldest sequence number of the other cache server 20n, which is the content transmission source, according to the content request. The content acquisition section 23 stores the acquired content in the content storage section 34. The content acquisition section 23 also reports the acquired CS-ID, oldest sequence number, and content ID to the management section 24.

When acquisition of the content is complete, the content acquisition section 23 reports to the content management device 40 that the content has been distributed to its own device. For example, the content acquisition section 23 transmits to the content management device 40, the information <abc, CS205> including the content ID of the content that has completed being acquired, and the CS-ID of its own device. The entry <abc, CS205> is thereby added to the content position list 44 of the content management device 40.

The management section 24 registers the CS-ID and the oldest sequence number reported from the content acquisition section 23 to the other-CS holding list 32. In this event, when an entry already exists for that cache server 20n, the management section 24 transfers the sequence number registered as the "oldest sequence number" of that entry to the "previous sequence number" in the other-CS holding list 32. Then, the management section 24 updates that entry by registering the reported oldest sequence number as the "oldest sequence number".

For example, as illustrated at the left side of FIG. 11, the content acquisition section 23 of the cache server 204 acquires the content abc from the cache server 203, and in this event, seq20 is acquired as the oldest sequence number of the cache server 203. Moreover, <CS203, seq15 (oldest sequence number), seq10 (previous sequence number)> is registered as the entry for the cache server 203 in the other-CS holding list 32 held by the cache server 204. In such cases, the management section 24 of the cache server 204 updates the entry for the cache server 203 in the other-CS holding list 32 held by the device itself with <C5203, seq20 (oldest sequence number), seq15 (previous sequence number)>.

The management section 24 also manages contents stored in the content storage section 34 of the device itself. In the present exemplary embodiment, the management section 24 manages the content stored in the content storage section 34 using a first in, first out (FIFO). When the accumulated volume of content stored in the content storage section 34 reaches a threshold value or greater, the management section 24 erases from the content storage section 34 in sequence from the oldest content in the accumulation sequence.

When the content ID is reported from the content acquisition section 23, the management section 24 allocates a new sequence number to that content, and registers the content in the content management list 33. The content management list 33 is a list that manages associations between content stored in the content storage section 34 of the device itself and sequence numbers allocated to the content. FIG. 15 illustrates an example of the content management list 33. Note that FIG. 15 is an example of the content management list 33 held by the cache server 203.

The management section 24 adds entries for content IDs and sequence numbers to the content management list 33 in the sequence in which content is accumulated in the content storage section 34. Namely, the management section 24 adds an entry to the end of the content management list 33 each time a new item of content is acquired by the content acquisition section 23. The management section 24 also erases entries corresponding to erased content in sequence from the start of the content management list 33 when content has been erased from the content storage section 34. Thus the first entry of the content management list 33 represents the oldest sequence number, and the last entry of the content management list 33 represents the sequence number allocated to the newest content held by the device itself (referred to as the "newest sequence number" hereafter).

The management section 24 also receives the target content ID reported from the selection section 22 in cases in which the target content is already held by the device itself that has received the group registration. The management section 24 acquires the sequence number corresponding to the reported target content ID from the content management list 33. The management section 24 then reports the target content ID and the acquired sequence number to the group information reception section 21.

Moreover, when content ID is reported from the content response section 25, described below, the management section 24 determines whether or not the device itself holds the target content based on whether or not the entry included in the reported content ID exists in the content management list 33. The management section 24 reports information indicating whether or not the target content is held by the device itself, and the oldest sequence number of the device itself, to the content response section 25.

When a content request transmitted from another cache server 20n is received, the content response section 25 reports the content ID of the requested content to the management section 24. The content response section 25 also receives information indicating whether or not the target content is held by the device itself reported from the management section 24, and the oldest sequence number of the device itself, according to the content ID report. When the target content is held by the device itself, the content response section 25 acquires the target content from the content storage section 34. The content response section 25 then transmits the acquired content to the cache server 20n that is the content request source, along with the oldest sequence number reported from the management section 24. However, when the target content is not held by the device itself, the content response section 25 transmits information indicating such, and the oldest sequence number reported from the management section 24, to the cache server 20n that is the content request source.

Figure 16:
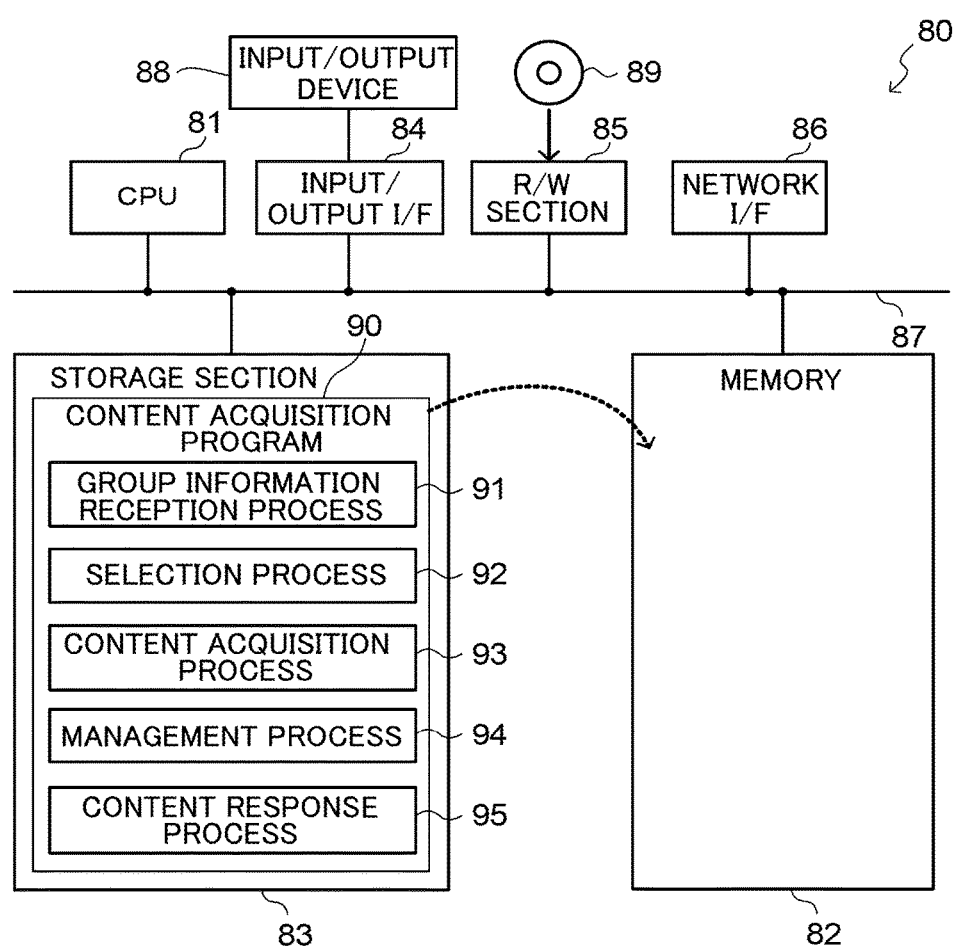
FIG. 16 is a block diagram illustrating a schematic configuration of a computer that functions as a cache server.

The cache server 20n may be implemented by, for example, a computer 80 illustrated in FIG. 16. The computer 80 includes a CPU 81, memory 82 serving as a temporary storage region, and a non-volatile storage section 83. The computer 80 also includes an input/output interface (I/F) connected to an input/output device 88. The computer 80 also includes a read/write (R/W) section 85 that controls reading and writing of data to and from a recording medium 89, and a network I/F 86 connected to a network such as the internet. The CPU 81, the memory 82, the storage section 83, the input/output I/F 84, the R/W section 85, and the network I/F 86 are connected to one another through a bus 87.

The computer 80 is also connected to the storage device 30n through the network I/F 86. The computer 80 is also connected to one of the local networks 701, 702, 703 through the network I/F 86.

The storage section 83 may be implemented by a hard disk drive (HDD), solid state drive (SSD), flash memory, or the like. The storage section 83, which serves as a recording medium, stores a content acquisition program 90 for causing the computer 80 to function as the cache server 20n. The CPU 81 reads the content acquisition program 90 from the storage section 83, expands the content acquisition program 90 into the memory 82, and sequentially executes the processes included in the content acquisition program 90. Moreover, the CPU 81 reads information stored in the storage device 30n, and expands the speed list 31, the other-CS holding list 32, and the content management list 33 respectively into the memory 82.

The content acquisition program 90 includes a group information reception process 91, a selection process 92, a content acquisition process 93, a management process 94, and a content response process 95.

The CPU 81 operates as the group information reception section 21 illustrated in FIG. 5 by executing the group information reception process 91. The CPU 81 also operates as the selection section 22 illustrated in FIG. 5 by executing the selection process 92. The CPU 81 also operates as the content acquisition section 23 illustrated in FIG. 5 by executing the content acquisition process 93. The CPU 81 also operates as the management section 24 illustrated in FIG. 5 by executing the management process 94. The CPU 81 also operates as the content response section 25 illustrated in FIG. 5 by executing the content response process 95. The computer 80 thereby executes the content acquisition program 90 and functions as the cache server 20n.

The content management device 40, and each of the user terminals 60n, may also be implemented by a computer including a CPU, memory, a storage section, an input-output I/F, an R/W section, a network I/F, and a bus. The functionality of the cache servers 20n, the content management device 40, and the user terminals 60n may also be implemented by, for example, a semiconductor integrated circuit, and more specifically with an Application Specific Integrated Circuit (ASIC) or the like.

Next, explanation follows regarding operation of the content acquisition system 10 according to the present exemplary embodiment. When group registration is performed from the user terminal 60n, a cache server 20n nearby to that user terminal 60n executes the group registration reception time processing illustrated in FIG. 17. Moreover, when a content request transmitted from another cache server 20n is received, the cache server 20n executes the content request reception time processing illustrated in FIG. 19. Detailed description follows regarding each processing. Note that the sequence number is shortened to "seq" in FIG. 17 to FIG. 19.

Figure 17:
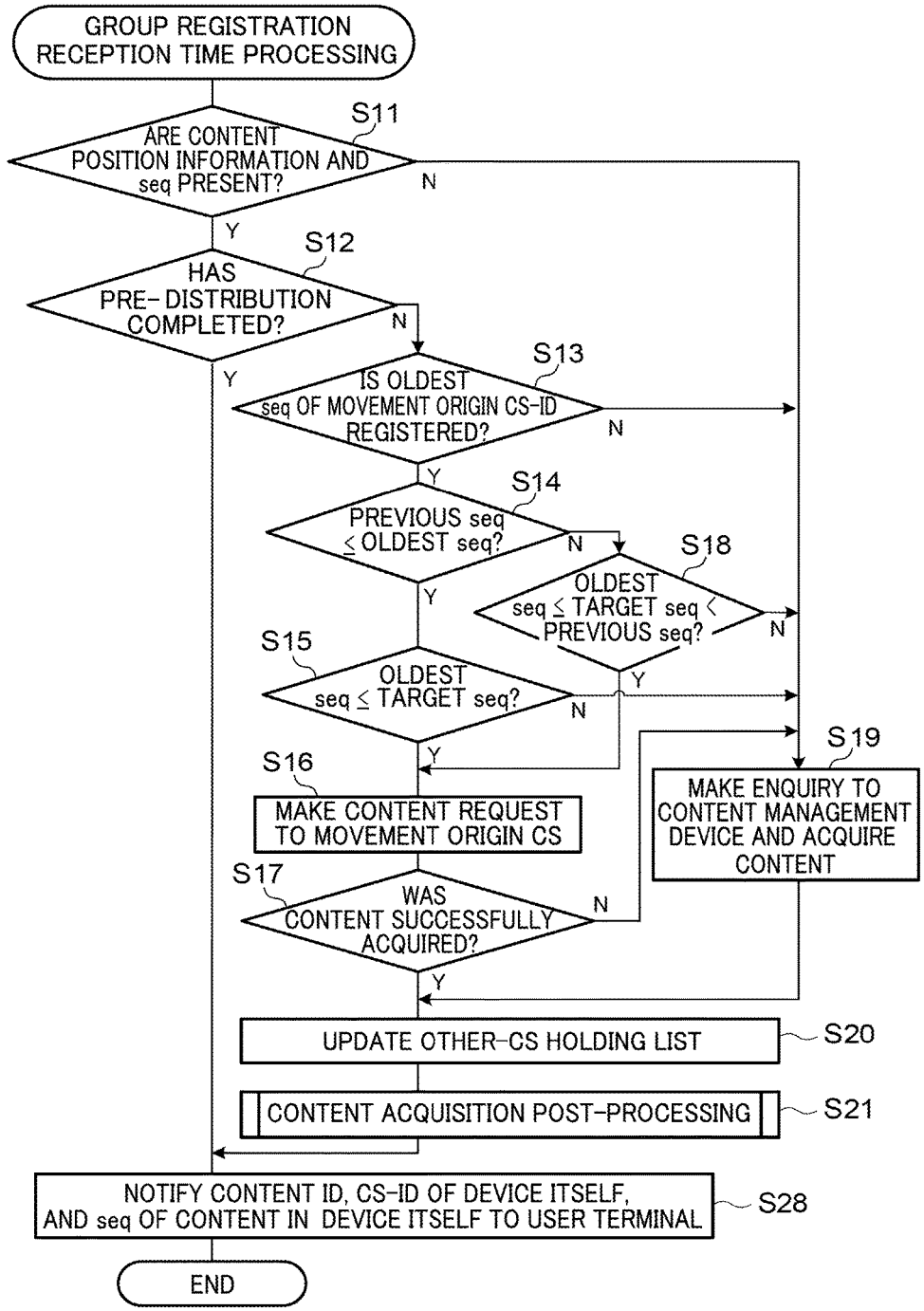
FIG. 17 is a flowchart illustrating an example of group registration reception time processing.

At step S11 of the group registration reception time processing illustrated in FIG. 17, the selection section 22 determines whether or not a content ID, a CS-ID, and a sequence number are included in the group registration message received by the group information reception section 21. When these are included in the group registration message, processing transitions to step S12, and when these are not included in the group registration message, processing transitions to step S19.

At step S12, the selection section 22 determines whether or not pre-distribution of the target content to the device itself has completed. More specifically, the selection section 22 extracts the content ID included in the group registration message as the target content ID. Then, in cases in which an entry that includes the target content ID exists in the content management list 33, the selection section 22 determines that pre-distribution of the target content to the device itself was completed, and processing transitions to step S28. However, when there exists no entry including the target content ID in the content management list 33, it is determined that the pre-distribution of the target content to the device itself was not completed, and processing transitions to step S13.

At step S13, the selection section 22 extracts the CS-ID included in the group registration message as the movement origin CS-ID, and determines whether or not the oldest sequence number corresponding to the movement origin CS-ID is registered in the other-CS holding list 32. Processing transitions to step S14 in cases in which the oldest sequence number corresponding to the movement origin CS-ID is registered in the other-CS holding list 32, and processing transitions to step S19 in cases in which the oldest sequence number corresponding to the movement origin CS-ID is not registered in the other-CS holding list 32.

At step S14, the selection section 22 determines whether or not the previous sequence number corresponding to the movement origin CS-ID in the other-CS holding list 32 is older than the oldest sequence number in the other-CS holding list 32. Processing transitions to step S15 in cases in which the previous sequence number is older than the oldest sequence number, and processing transitions to step S18 in cases in which the previous sequence number is newer than the oldest sequence number.

At step S15, the selection section 22 extracts the sequence number included in the group registration message as the target sequence number. The selection section 22 then determines whether or not the oldest sequence number corresponding to the movement origin CS-ID is older than the target sequence number. In cases in which the oldest sequence number is older than the target sequence number, the selection section 22 determines that there is a high possibility of the target content being held by the movement origin CS, and processing transitions to step S16. However, in cases in which the oldest sequence number is newer than the target sequence number, the selection section 22 determines that there is a low possibility of the target content being held by the movement origin CS, and processing transitions to step S19.

At step S16, the selection section 22 selects the movement origin CS as the content request destination, and the content acquisition section 23 makes a request to the movement origin CS for the target content.

Next, at step S17, the content acquisition section 23 determines whether or not the content transmitted from the movement origin CS was acquired based on the content request. In cases in which the content was acquired, processing transitions to step S20, and in cases in which the content was not acquired even after a specific time had elapsed, processing transitions to step S19.

Cases in which negative determination is made at step S14 and processing transitions to step S18 represent cases in which the sequence numbers used have returned to the start. The selection section 22 therefore determines whether or not the target sequence number is the oldest sequence number or higher, and is less than the previous sequence number. In cases in which affirmative determination is made, processing transitions to step S16, and the selection section 22 makes a request to the movement origin CS for the target content. However, in cases in which negative determination is made, processing transitions to step S19.

At step S19, the selection section 22 makes a content position enquiry to the content management device 40. Based on the content position acquired from the content management device 40, the selection section 22 then selects the cache server 20n having the earliest predicted acquisition completion time as the content request destination. The content acquisition section 23 then makes a request to the cache server 20n selected by the selection section 22 for the target content, and acquires the target content together with the oldest sequence number.

Next, at step S20, the content acquisition section 23 reports to the management section 24 the oldest sequence number that was acquired together with the acquired content ID of the content, the CS-ID of the content acquisition destination cache server 20n, and the content. The other-CS holding list 32 is updated by the management section 24 based on the reported CS-ID and oldest sequence number.

Figure 18:
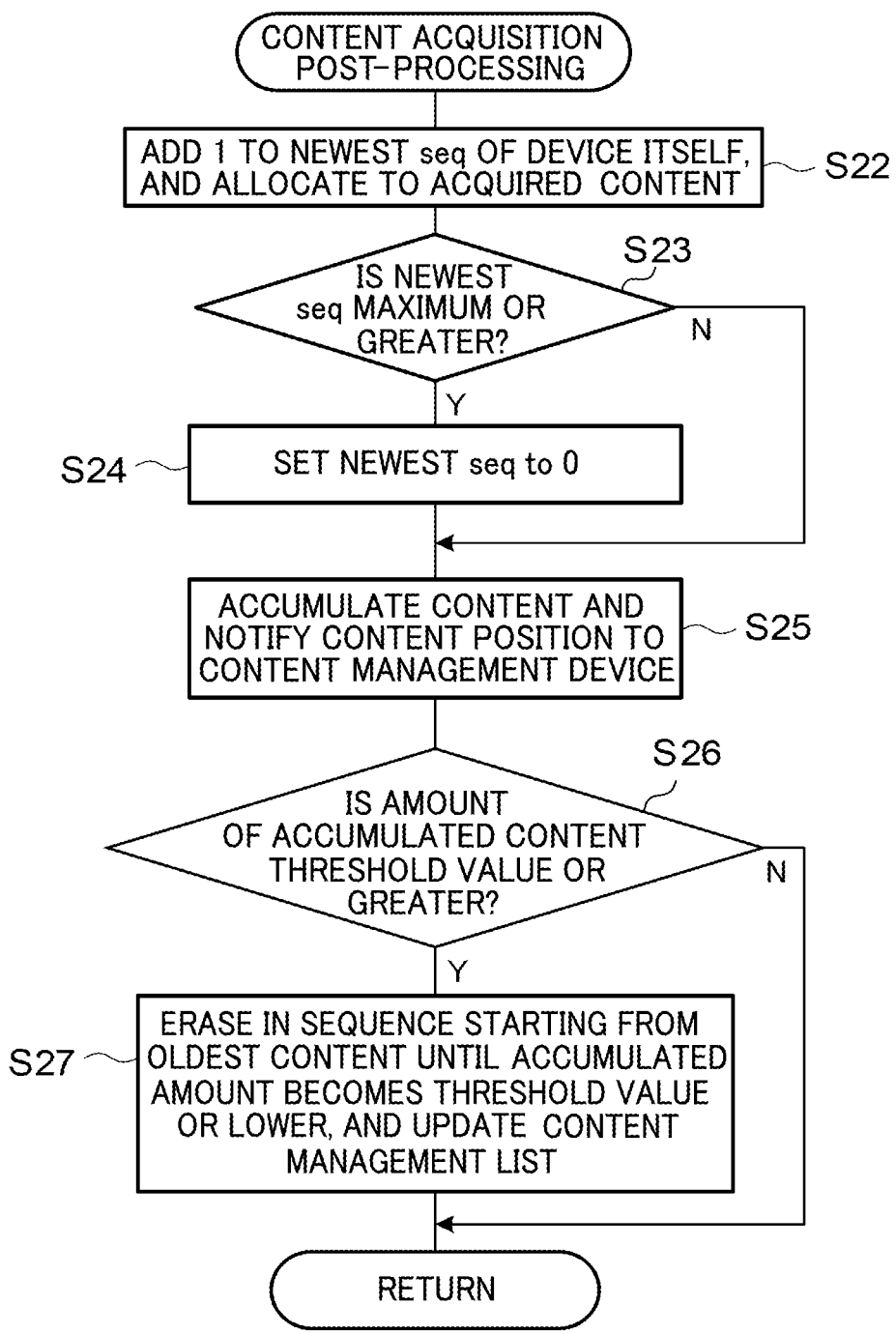
FIG. 18 is a flowchart illustrating an example of content acquisition post-processing.

Next, at step S21, the content acquisition post-processing, illustrated in detail in FIG. 18, is executed.

At step S22 of the content acquisition post-processing illustrated in FIG. 18, the management section 24 acquires the newest sequence number of the device itself from the content management list 33, and allocates a sequence number, obtained by adding 1 to the newest sequence number, to the content acquired at step S17 or S19 above. The management section 24 then adds an entry including the allocated sequence number to the end of the content management list 33. The added sequence number thus becomes the newest sequence number.

Next, at step S23, the management section 24 determines whether or not the newest sequence number has reached the maximum value. Processing transitions to step S24 in cases in which the newest sequence number has reached the maximum value. At step S24, the management section 24 sets the newest sequence number of step S22 above to 0 for the next time step S22 above is executed, and processing transitions to step S25. Namely, the next time step S22 above is executed, 1 is allocated as the newest sequence number. The limited sequence numbers can thereby be returned to the start and reused. In cases in which the newest sequence number has not reached the maximum value, processing skips step S24 and transitions to step S25.

At step S25, the content acquisition section 23 accumulates the acquired content in the content storage section 34. The content acquisition section 23 then transmits information including the content ID of the content and CS-ID of the device itself, for which acquisition has completed, to the content management device 40, so as to notify the content management device 40 that the content has been distributed to the device itself.

Next, at step S26, the management section 24 determines whether or not the accumulated volume of content stored in the content storage section 34 has reached the threshold value or above. In cases in which the accumulated volume has reached the threshold value or above, processing transitions to step S27, and the management section 24 erases the accumulated volume in sequence starting from the oldest content, namely, in sequence starting from the content having the oldest sequence number that was written to the content storage section 34 until the threshold value or below is reached. The management section 24 also erases entries corresponding to the erased content from the content management list 33, and processing returns to the group registration reception time processing illustrated in FIG. 17. In cases in which the content volume has not reached the threshold value, processing skips step S27, and returns to the group registration reception time processing illustrated in FIG. 17.

Next, at step S28 of the group registration reception time processing illustrated in FIG. 17, the group information reception section 21 transmits a message to the user terminals 60$n$ stating that the group registration was received. The group information reception section 21 includes the content ID of the target content pre-distributed to the device itself, the CS-ID of the device itself, and the sequence number allocated to the target content in the device itself, in the message. The content position and sequence number of the target content are thereby reported to the user terminal 60$n$, and the group registration reception time processing ends.

Next, explanation follows regarding the content request reception time processing.

Figure 19:
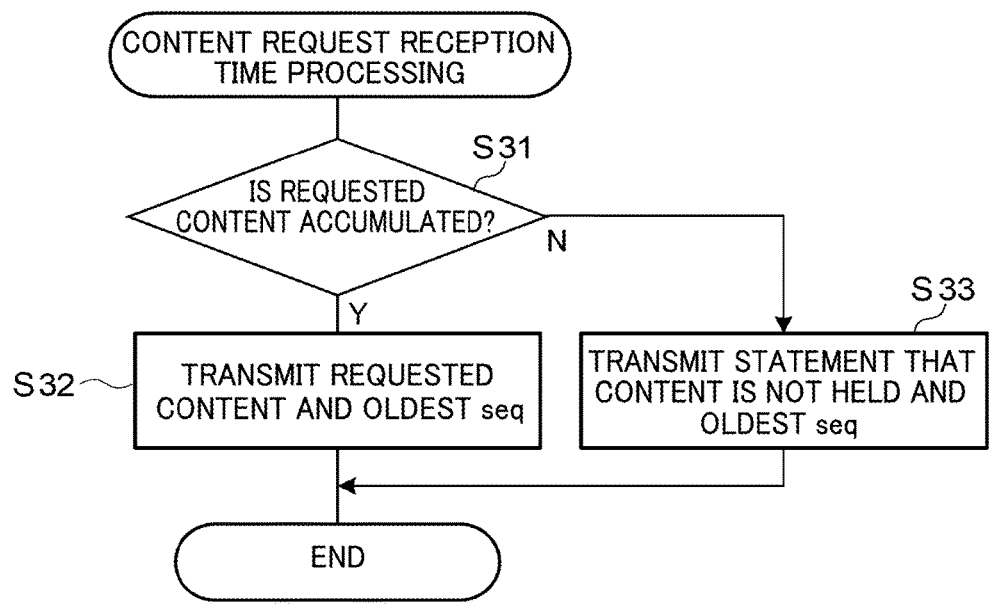
FIG. 19 is a flowchart illustrating an example of content request reception time processing.

At step S31 of the content request reception time processing illustrated in FIG. 19, the content response section 25 reports the content ID of the requested content to the management section 24. The management section 24 then references the content management list 33, and determines whether or not the content indicated by the reported content ID is held by the device itself. Processing transitions to step S32 in cases in which the content is held in the device itself, and processing transitions to step S33 in cases in which the content is not held in the device itself.

At step S32, the management section 24 acquires the oldest sequence number of the device itself from the content management list 33. The content response section 25 then acquires the target content from the content storage section 34, and transmits the target content to the content request source cache server 20$n$ together with the sequence number acquired by the management section 24. At step S33, the management section 24 acquires the oldest sequence number of the device itself from the content management list 33. The content response section 25 then transmits information stating that the target content is not held to the content request source cache server 20$n$, together with the oldest sequence number. The content request reception time processing then ends.

Figure 20:
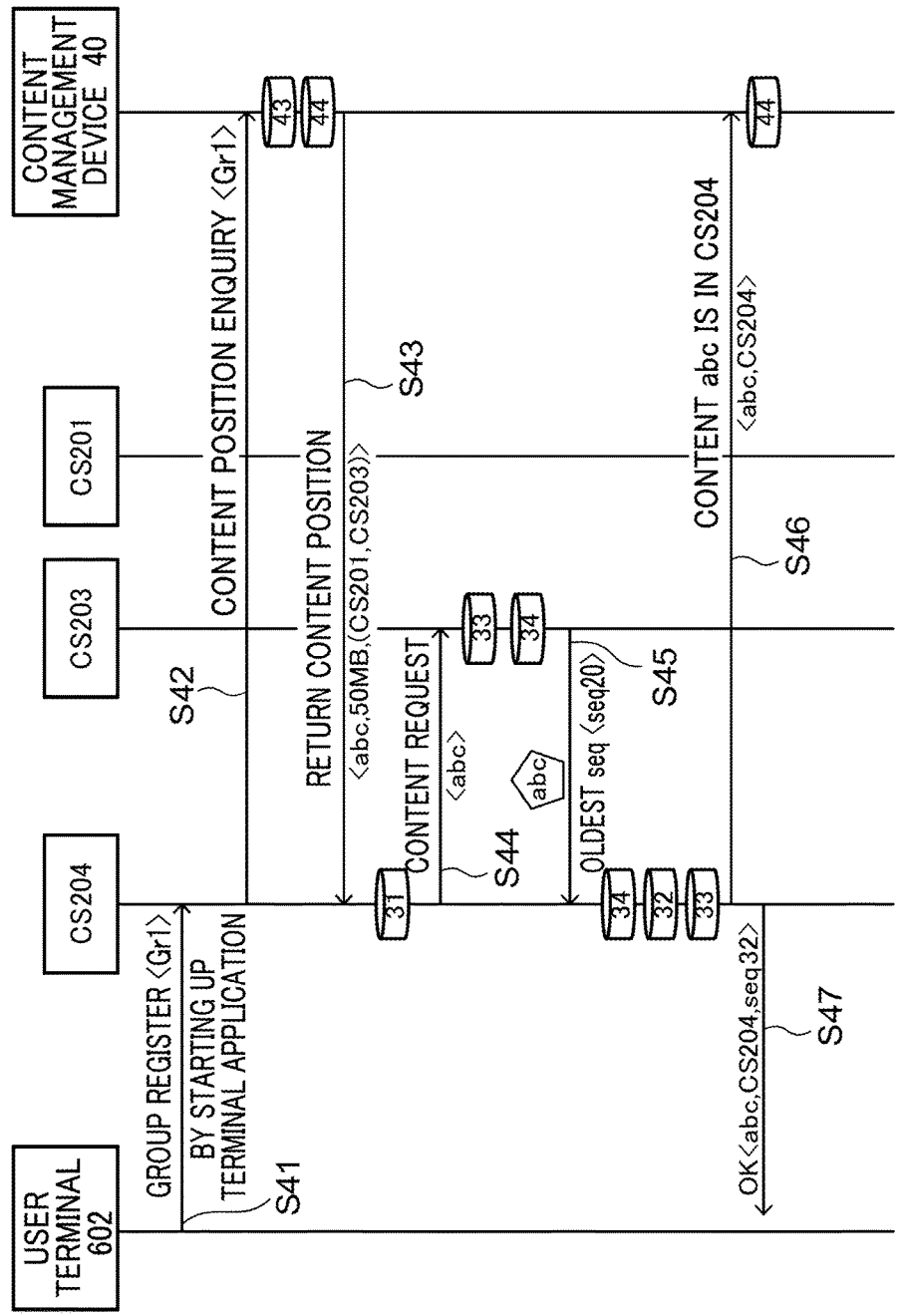
FIG. 20 is a sequence diagram illustrating an example of processing in a content acquisition system.
Figure 21:
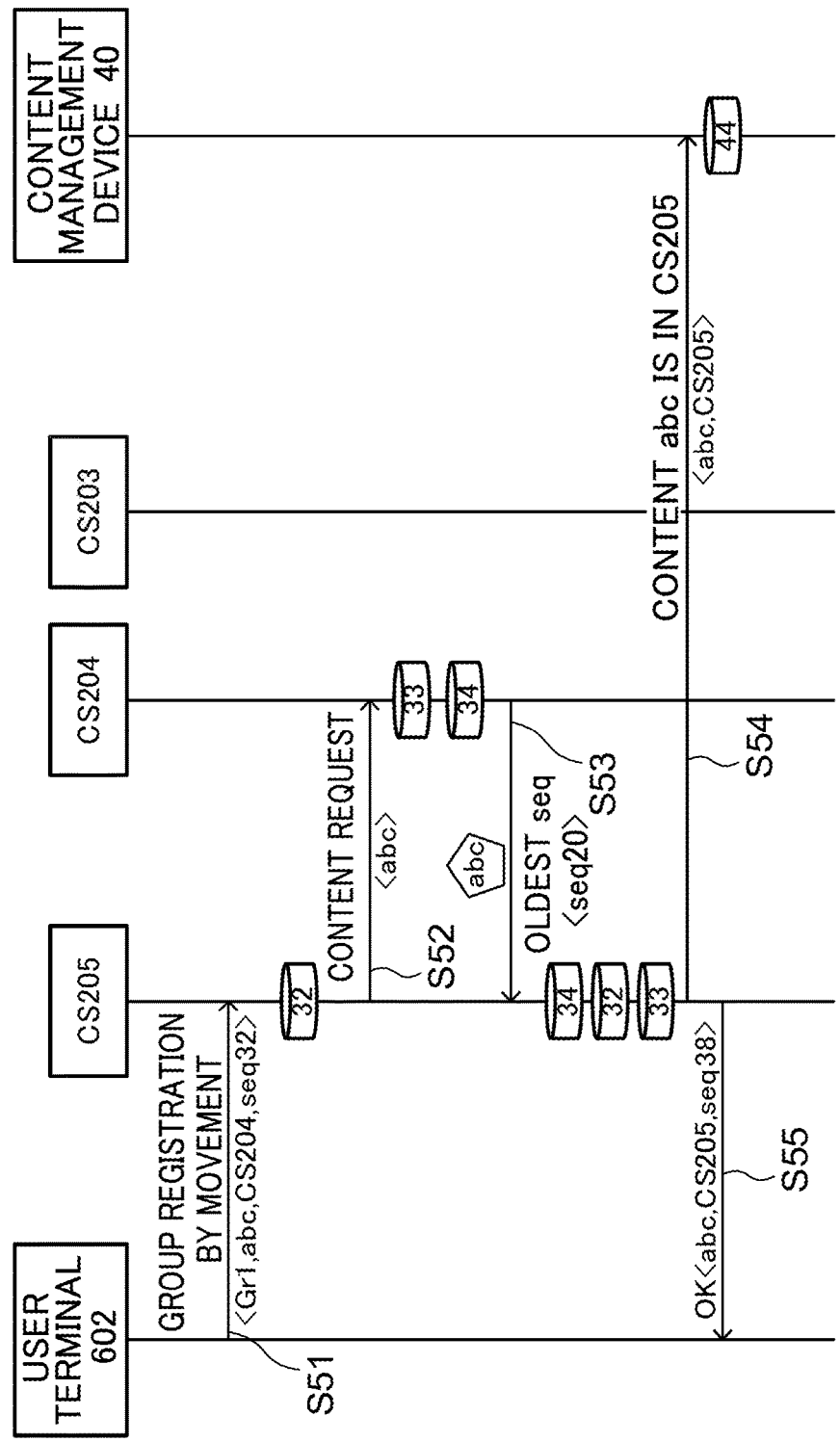
FIG. 21 is a sequence diagram illustrating an example of processing in a content acquisition system.
Figure 22:
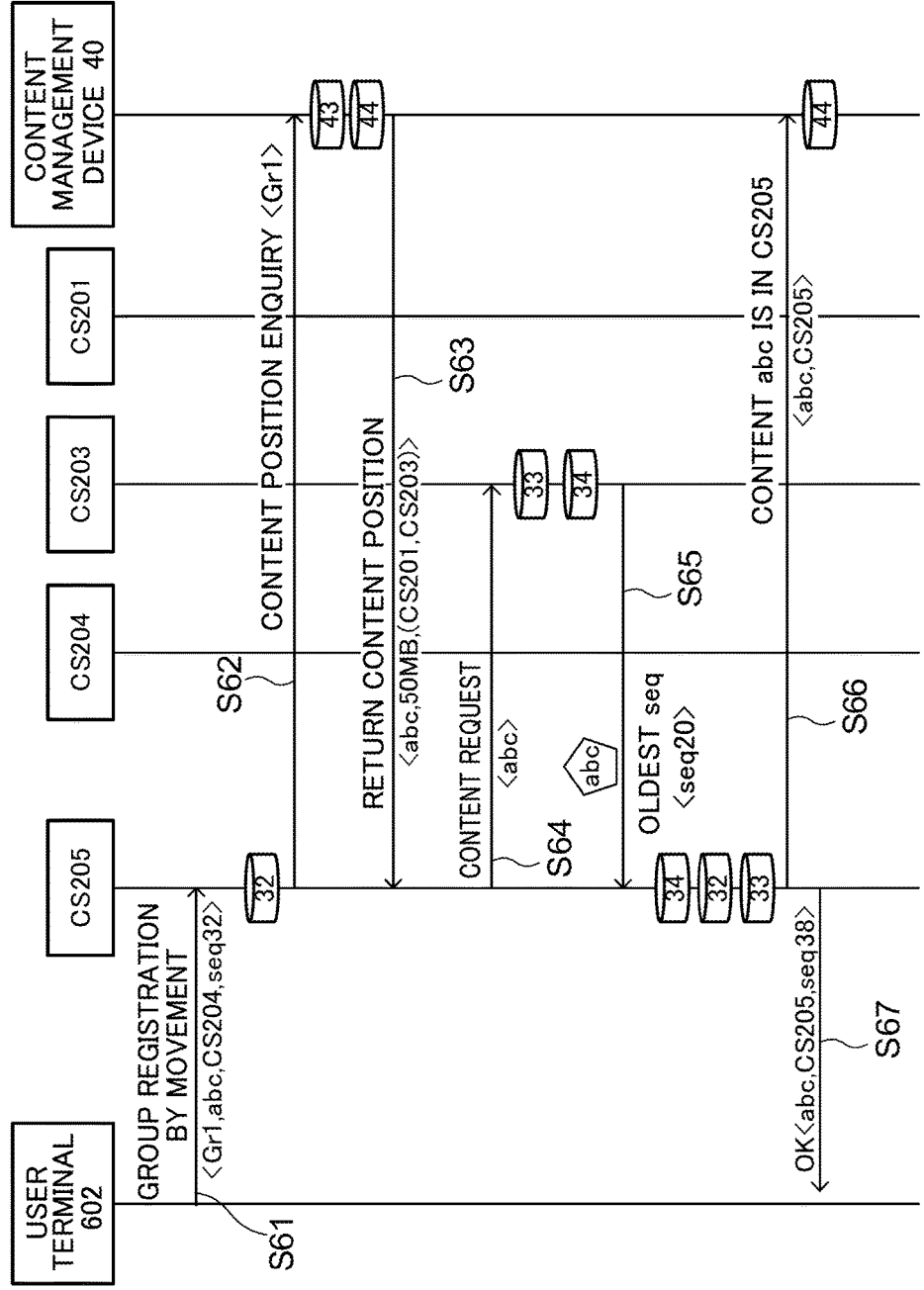
FIG. 22 is a sequence diagram illustrating an example of processing in a content acquisition system.

Next, explanation follows regarding an example of content acquisition processing in the content acquisition system 10 according to the present exemplary embodiment, focusing on exchange of information between devices, with reference to the sequence diagrams of FIG. 20 to FIG. 22. Similarly to FIG. 11, FIG. 20 to FIG. 22 explain an example in which, after group registration to the cache server 204, the user terminal 602 moves in a state in which the terminal app remains started up, and group registers to the cache server 205. Moreover, the user terminal 60$n$ is assigned to the group Gr1, and processing starts from a state in which the shared content of the group Gr1 is content abc, and in which the content abc is accumulated in the user terminals 201, 203.

First, group registration is made from the user terminal 602 to the cache server 204 due to the terminal app starting up (S41). In such cases, the group ID<Gr1> is included in the group registration message, and the content ID, CS-ID, and the sequence number are not included in the group registration message.

In the cache server 204, the selection section 22 uses the group ID<Gr1> to make an enquiry to the content management device 40 for the position of the target content (S42).

In the content management device 40, the controller 41 acquires the content ID and size <abc, 50 Mb> corresponding to the group ID<Gr1> from the content list 43 (FIG. 3). The controller 41 then acquires the CS-IDs <CS201, CS202> of the cache servers holding the content abc from the content position list 44 (FIG. 4). Then, information including the content ID, the size, and the CS-ID<abc, 50 Mb, (CS201, CS203)> is returned from the content management device 40 to the cache server 204.

In the cache server 204, the selection section 22 references the speed list 31 (FIG. 6), and selects the cache server 203, which has the earliest predicted acquisition completion time for the content abc. The selection section 22 then transmits a content request including the content ID<abc> to the cache server 203 (S44).

In the cache server 203, the management section 24 acquires the oldest sequence number <seq20> of the cache server 203 from the content management list 33 (FIG. 15). The content response section 25 also acquires the content abc from the content storage section 34. The content response section 25 then transmits the content abc and the oldest sequence number <seq20> to the cache server 204 (S45).

In the cache server 204, the content acquisition section 23 accumulates the acquired content abc in the content storage section 34. Moreover, the management section 24 updates the entries of the other-CS holding list 32 (FIG. 12) of the cache server 203, based on the acquired oldest sequence number <seq20>. The management section 24 also updates the content management list 33 (FIG. 23) by appending the new sequence number <seq32> to the acquired content abc.

Moreover, in the cache server 204, the content acquisition section 23 reports information <abc, CS204> to the content management device 40 stating that the content abc is held in the cache server 204 (S46). In the content management device 40, the controller 41 updates the content position list 44 (FIG. 4) based on the reported <abc, CS204>.

Moreover, in the cache server 204, the group information reception section 21 information <abc, CS204, seq32> that includes the content position information indicating that the content abc related to the group registration is held in the cache server 204, and that includes the sequence number for that content in the cache server 204, is returned to the user terminal 602 (S47).

Next, explanation follows regarding a case in which, after the processing of FIG. 20, the user terminal 602 moves to being under management of the cache server 205 in a state in which the terminal app remains started up, with reference to FIG. 21. In such cases, a group registration <Gr1, abc, CS204, seq32>, which includes the information <abc, CS204, seq32> received by the user terminal 602 at step S47 of FIG. 20, is made to the cache server 205 (S51).

In the cache server 205, the selection section 22 compares the oldest sequence number <seq5> of the cache server 204 against the previous sequence number <seq1> in the other-CS holding list 32 (FIG. 24). The selection section 22 also compares the sequence number <seq32> included in the group registration against the oldest sequence number <seq5>. The selection section 22 uses this comparison to determine that there is a high possibility that the cache server 204 holds the content abc, and makes a request to the cache server 204 for the content abc (S52).

In the cache server 204, the management section 24 acquires the oldest sequence number <seq10> from the content management list 33 (FIG. 23). The content response section 25 then transmits the content abc and the oldest sequence number <seq10> to the cache server 205.

In the cache server 205, similarly to in the cache server 204 after S45 of FIG. 20, the content abc is accumulated in the content storage section 34. Moreover, entries in the other-CS holding list 32 (FIG. 24) related to the cache server 204 are updated. The content management list 33 (FIG. 25) is also updated by allocating a new sequence number <seq38> to the acquired content abc.

Moreover, in the cache server 205, similarly to at S46 of FIG. 20, <abc, CS205> is reported to the content management device 40 (S54), and the content position list 44 (FIG. 4) is updated in the content management device 40.

Moreover, in the cache server 205, similarly to at S47 of FIG. 20, <abc, CS205, seq38> is returned to the user terminal 602 (S55).

Determination as to whether or not the movement origin CS holds the target content is made by including the content ID, the CS-ID, and the sequence number in the group registration message in this manner, and when it is determined that the movement origin CS holds the content, a request is made to the movement origin CS for the content. Thus the time needed to pre-distribute content can be shorted since there is no need to make an enquiry to the content management device 40 (S42 and S43 of FIG. 20).

Next, explanation follows regarding a case in which the other-CS holding list 32 held by the cache server 205 is like that illustrated in FIG. 26 when group registration (S61) is performed similarly to in S51 of FIG. 21, with reference to FIG. 22.

In the cache server 205, the selection section 22 compares the sequence number <seq32> included in the group registration against the oldest sequence number <seq51> of the cache server 204 in the other-CS holding list 32 (FIG. 26). In such cases, the selection section 22 determines that the cache server 204 does not hold the content abc, and makes an enquiry to the content management device 40 for the content position (S62) without making a request to the cache server 204 for the content abc.

Hereafter, similarly to in S43 to S45 of FIG. 20, the cache server 205 acquires the content abc and the oldest sequence number from the cache server 203 based on the content position from the content management device 40 (S63 to S65). Then, similarly to in S54 and S55 of FIG. 21, the cache server 205 reports to the content management device 40, and returns to the user terminal 602 (S66 and S67).

Thus the content position is acquired from the content management device 40 in cases which it can be determined that the target content is not held by the movement origin CS. This enables unnecessary content requests to the movement origin CS (S52 and S53 of FIG. 21) to be avoided.

As explained above, the content acquisition system according to the present exemplary embodiment causes a user terminal to hold content position information, and performs group registration using that information. Moreover, sequence numbers are allocated in the sequence that content accumulates in each cache server, and the sequence numbers are also included in group registration messages along with the content position information. Moreover, in each of the cache serves, content holding states of other cache servers are managed using the sequence numbers. Then, in a cache server that makes a request for content, it is determined whether or not a content request is to be made to the cache server (movement origin CS) indicated by the content position information obtained from the group registration, using the sequence numbers. This enables unnecessary requests for content to be curtailed.

Moreover, by employing a sequence number as the information for determining whether or not the target content is held by the movement origin CS, the actual state of content being accumulated or erased can be ascertained more accurately than in cases in which timing information is employed Moreover, in a service that pre-distributes content, addition and erasure of content to and from each of the cache servers is appropriately managed by a FIFO, enabling management of held states of content to be implemented using sequence numbers as described above.

Note that since determination is established using the oldest sequence number and the previous sequence number in the present exemplary embodiment, there is a need to make the maximum value of the sequence number a high value compared to the number of items of content that can be held by a single cache server (content storage section). However, 64 bit values generally employed by recent computers are sufficient for a "high value". Moreover, even in cases in which only a small value can be set as the maximum value of the sequence number, producing inconsistencies in the above processing, it is simply determined that the movement origin CS does not hold the target content even though the target content is held by the movement origin CS, and problems do not occur in the pre-distribution of content itself.

Explanation has been given in the exemplary embodiment above of cases in which the trigger for pre-distribution of content to a cache server is group registration (subscription) from a user terminal, however there is no limitation thereto. Connection from a user terminal prior to requesting content, such as login by a user, or connection of the user terminal to an access point corresponding to the cache server, may be employed as the trigger.

Moreover, although explanation has been given regarding a case in which the oldest sequence number of the device itself is also transmitted when content is transmitted according to a request from another cache server in the above exemplary embodiment, there is no limitation thereto. For example, the oldest sequence number of another cache server may be acquired by transmitting and receiving the oldest sequence numbers periodically between cache servers.

Explanation has been given in the above exemplary embodiment of cases in which the content position list 44 is stored in the content management device 40, however there is no limitation thereto. A content position list management device for managing the content position list 44 may be provided separately to the content management device 40.

Explanation has been given above of a situation in which the content acquisition program 90 is pre-stored (pre-installed) on the storage section 83, however the content acquisition program 90 may be distributed in a format recorded on a recording medium, such as a CD-ROM or DVD-ROM.

Similarly to in related technology, it is envisaged that each cache server will acquire content from content serves that manage master copies of content in technology in which content is distributed to cache servers. However, a large number of cache servers accessing the content server would place a high load on the content server, resulting in an issue that time is taken until content is distributed to the cache servers.

However, acquisition of content from other cache servers to which the content has already been distributed is conceivable. However, the cache servers sequentially erase old content in order to effectively utilize limited resources, and sometimes it is not known what content the cache servers currently hold. Accordingly, when a content request is made to a cache server that has already erased the content, that content request is ineffective.

According to one aspect of technology disclosed herein, unnecessary content requests can be curtailed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing a content acquisition program that causes a computer to execute a process, the process comprising:
   receiving a content acquisition request including identification information of a device, identification information of acquisition target content, and sequence information indicating a sequence of accumulation of the acquisition target content in the device;
   referencing different device holding information in which identification information of a different device is associated with an oldest sequence information that indicates an accumulation sequence of the oldest content that has been accumulated in the different device corresponding to the oldest content held by the different device, wherein, in the different device, older content among holding contents is sequentially deleted;
   making a request to the device indicated by the device identification information included in the content acquisition request for the acquisition target content, in cases in which the accumulation sequence indicated by the sequence information associated with the identification information of the device included in the content acquisition request is older than the accumulation sequence indicated by the sequence information included in the content acquisition request;
   searching for a device holding the acquisition target content and making a request to a found device for the acquisition target content, in cases in which the accumulation sequence indicated by the sequence information associated with the identification information of the device included in the content acquisition request is newer than the accumulation sequence indicated by the sequence information included in the content acquisition request;
   storing, as the different device holding information, the requested acquired content and the identification information of the device that is an acquisition source of the acquired content, in association with the sequence information corresponding to the oldest content held by the device; and
   responding to a request source of the content acquisition request with identification information of the acquired content, identification information of the device that received the content acquisition request, and sequence information indicating the sequence in which the acquired content was accumulated in the device that received the content acquisition request.

2. The non-transitory recording medium of claim 1, wherein, in the process, identification information of the content obtained from the device to which the content acquisition request was transmitted prior to movement of the request source of the content acquisition request, the identification information of the device, and the sequence information are included in any content acquisition requests transmitted after the request source has moved.

3. The non-transitory recording medium of claim 1, wherein in the process:
   when the identification information of the device acquired together with the requested content is associated with the sequence information and stored as the different device holding information, sequence information that has been stored as sequence information corresponding to the oldest content prior to sequence information acquired at a current time is stored as previous time information, and the sequence information acquired at the current time is stored as oldest information; and
   in cases in which an accumulation sequence indicated by the previous time information is older than the accumulation sequence indicated by the oldest information, the acquisition target content is requested from the device indicated by the identification information of the device included in the content acquisition request when the accumulation sequence indicated by the sequence information included in the content acquisition request is the accumulation sequence indicated by the oldest information or greater but less than the accumulation sequence indicated by the previous time information.

4. The non-transitory recording medium of claim 1, the process further comprising:
   in cases in which a total volume of a plurality of items of accumulated content is a predetermined threshold value or greater, erasing in sequence starting from an oldest content in the accumulation sequence indicated by the sequence information until the volume of the plurality of items of content is lower than the threshold value.

5. A content acquisition device comprising:
a processor configured to execute a process, the process comprising:
receiving a content acquisition request including identification information of a device, identification information of acquisition target content, and sequence information indicating a sequence of accumulation of the acquisition target content in the device;
referencing different device holding information in which identification information of a different device is associated with an oldest sequence information that indicates an accumulation sequence of the oldest content that has been accumulated in the different device corresponding to the oldest content held by the different device, wherein, in the different device, older content among holding contents is sequentially deleted;
making a request to the device indicated by the device identification information included in the content acquisition request for the acquisition target content, in cases in which the accumulation sequence indicated by the sequence information associated with the identification information of the device included in the content acquisition request is older than the accumulation sequence indicated by the sequence information included in the content acquisition request;
searching for a device holding the acquisition target content and making a request to a found device for the acquisition target content, in cases in which the accumulation sequence indicated by the sequence information associated with the identification information of the device included in the content acquisition request is newer than the accumulation sequence indicated by the sequence information included in the content acquisition request;
storing, as the different device holding information, the requested acquired content and the identification information of the device that is an acquisition source of the acquired content, in association with the sequence information corresponding to the oldest content held by the device; and
responding to a request source of the content acquisition request with identification information of the acquired content, identification information of the device that received the content acquisition request, and sequence information indicating the sequence in which the acquired content was accumulated in the device that received the content acquisition request.

6. The content acquisition device of claim 5, wherein, in the process, identification information of the content obtained from the device to which the content acquisition request was transmitted prior to movement of the request source of the content acquisition request, the identification information of the device, and the sequence information are included in any content acquisition requests transmitted after the request source has moved.

7. The content acquisition device of claim 5, wherein in the process:
when the identification information of the device acquired together with the requested content is associated with the sequence information and stored as the different device holding information, sequence information that has been stored as sequence information corresponding to the oldest content prior to sequence information acquired at a current time is stored as previous time information, and the sequence information acquired at the current time is stored as oldest information; and
in cases in which an accumulation sequence indicated by the previous time information is older than the accumulation sequence indicated by the oldest information, the acquisition target content is requested from the device indicated by the identification information of the device included in the content acquisition request when the accumulation sequence indicated by the sequence information included in the content acquisition request is the accumulation sequence indicated by the oldest information or greater but less than the accumulation sequence indicated by the previous time information.

8. The content acquisition device of claim 5, the process further comprising:
in cases in which a total volume of a plurality of items of accumulated content is a predetermined threshold value or greater, erasing in sequence starting from an oldest content in the accumulation sequence indicated by the sequence information until the volume of the plurality of items of content is lower than the threshold value.

9. A content acquisition method comprising:
receiving a content acquisition request including identification information of a device, identification information of acquisition target content, and sequence information indicating a sequence of accumulation of the acquisition target content in the device;
by a processor, referencing different device holding information in which identification information of a different device is associated with an oldest sequence information that indicates an accumulation sequence of the oldest content that has been accumulated in the different device corresponding to the oldest content held by the different device, wherein, in the different device, older content among holding contents is sequentially deleted;
making a request to the device indicated by the device identification information included in the content acquisition request for the acquisition target content, in cases in which the accumulation sequence indicated by the sequence information associated with the identification information of the device included in the content acquisition request is older than the accumulation sequence indicated by the sequence information included in the content acquisition request;
searching for a device holding the acquisition target content and making a request to a found device for the acquisition target content, in cases in which the accumulation sequence indicated by the sequence information associated with the identification information of the device included in the content acquisition request is newer than the accumulation sequence indicated by the sequence information included in the content acquisition request;
storing, as the different device holding information, the requested acquired content and the identification information of the device that is an acquisition source of the acquired content, in association with the sequence information corresponding to the oldest content held by the device; and
responding to a request source of the content acquisition request with identification information of the acquired content, identification information of the device that received the content acquisition request, and sequence information indicating the sequence in which the acquired content was accumulated in the device that received the content acquisition request.

10. The content acquisition method of claim 9, wherein identification information of the content obtained from the device to which the content acquisition request was transmitted prior to movement of the request source of the content acquisition request, the identification information of the device, and the sequence information are included in any content acquisition requests transmitted after the request source has moved.

11. The content acquisition method of claim 9, wherein:
when the identification information of the device acquired together with the requested content is associated with the sequence information and stored as the different device holding information, sequence information that has been stored as sequence information corresponding to the oldest content prior to sequence information acquired at a current time is stored as previous time information, and the sequence information acquired at the current time is stored as oldest information; and
in cases in which an accumulation sequence indicated by the previous time information is older than the accumulation sequence indicated by the oldest information, the acquisition target content is requested from the device indicated by the identification information of the device included in the content acquisition request when the accumulation sequence indicated by the sequence information included in the content acquisition request is the accumulation sequence indicated by the oldest information or greater but less than the accumulation sequence indicated by the previous time information.

12. The content acquisition method of claim 9, further comprising:
in cases in which a total volume of a plurality of items of accumulated content is a predetermined threshold value or greater, erasing in sequence starting from an oldest content in the accumulation sequence indicated by the sequence information until the volume of the plurality of items of content is lower than the threshold value.

* * * * *